(12) United States Patent
Irie et al.

(10) Patent No.: US 9,318,246 B2
(45) Date of Patent: Apr. 19, 2016

(54) SOLENOID DRIVE DEVICE

(71) Applicant: AISIN AW CO., LTD., Anjo-shi, Aichi-ken (JP)

(72) Inventors: Keiichiro Irie, Okazaki (JP); Tomoyuki Tanaka, Konan (JP)

(73) Assignee: AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 14/408,421

(22) PCT Filed: Jul. 26, 2013

(86) PCT No.: PCT/JP2013/070346
§ 371 (c)(1),
(2) Date: Dec. 16, 2014

(87) PCT Pub. No.: WO2014/017639
PCT Pub. Date: Jan. 30, 2014

(65) Prior Publication Data
US 2015/0179322 A1  Jun. 25, 2015

(30) Foreign Application Priority Data

Jul. 27, 2012  (JP) ................................ 2012-167365
Mar. 27, 2013  (JP) ................................ 2013-067521

(51) Int. Cl.
*H01F 3/00* (2006.01)
*H01F 7/08* (2006.01)
(Continued)

(52) U.S. Cl.
CPC .............. *H01F 3/00* (2013.01); *F16K 31/0613* (2013.01); *F16K 31/0675* (2013.01); *H01F 7/081* (2013.01); *H01F 7/16* (2013.01); *H01F 7/1607* (2013.01)

(58) Field of Classification Search
CPC .............. H01F 3/00; H01F 31/02; F01F 7/16; F01F 7/126; F01F 7/08; F01F 7/13; F16K 31/061363; F16K 31/06; F16K 49/00

USPC ......................................................... 335/281
See application file for complete search history.

(56) References Cited

U.S. PATENT DOCUMENTS 5,718,259 A * 2/1998 Miyake .............. F02M 25/0773
                                                        137/338
6,864,771 B2 * 3/2005 Komiyama ............... F01N 3/22
                                                        251/129.15
(Continued)

FOREIGN PATENT DOCUMENTS

JP         03-25206 U    3/1991
JP       11-287348 A    10/1999
(Continued)

OTHER PUBLICATIONS

International Search Report of PCT/JP2013/070346 dated Nov. 5, 2013 [PCT/ISA/210].

*Primary Examiner* — Shawki S Ismail
*Assistant Examiner* — Lisa Homza
(74) *Attorney, Agent, or Firm* — Sughrue Mion, PLLC

(57) ABSTRACT

An inexpensive solenoid drive device with high magnetic performance is implemented in which a portion accommodating a plunger and a portion attracting the plunger are integrated with a core as a ferromagnetic body. A core includes a magnetic flux limiting portion that is located in a region on the biasing direction side of a first imaginary boundary plane and that is formed so as to have a small thickness in a radial direction, and an increased diameter portion that is formed so that its thickness the radial direction is increased in a continuous or stepwise manner from the first imaginary boundary plane toward the opposite biasing direction side. The increased diameter portion has a recessed portion whose outer surface is recessed toward a radial inner surface with respect to a predetermined increased diameter reference line in axial section of the core.

20 Claims, 10 Drawing Sheets

(51) Int. Cl.
*F16K 31/06* (2006.01)
*H01F 7/16* (2006.01)

(56) References Cited

U.S. PATENT DOCUMENTS

| | | | | |
|---|---|---|---|---|
| 6,959,732 | B2* | 11/2005 | Cotton, III | F01L 9/02 137/625.65 |
| 7,944,333 | B2* | 5/2011 | Swartzentruber | H01H 50/023 335/202 |
| 8,109,487 | B2* | 2/2012 | Kokubu | F16K 31/0613 251/129.15 |
| 8,534,247 | B2* | 9/2013 | Hori | F01L 1/3442 123/90.17 |
| 8,576,032 | B2* | 11/2013 | Herbert | F16K 7/16 251/129.15 |
| 2002/0175569 | A1 | 11/2002 | Komiyama et al. | |
| 2004/0201442 | A1* | 10/2004 | Herbert | E03D 5/10 335/220 |
| 2009/0121817 | A1* | 5/2009 | Ishibashi | H01F 7/1607 335/255 |
| 2012/0212309 | A1* | 8/2012 | Kondo | F16K 31/0613 335/262 |
| 2012/0242436 | A1* | 9/2012 | Murao | H01F 7/081 335/255 |
| 2013/0068975 | A1* | 3/2013 | Kondo | F01L 1/34 251/129.01 |
| 2013/0134338 | A1* | 5/2013 | Suzuki | F01L 1/3442 251/129.15 |
| 2015/0179322 | A1* | 6/2015 | Irie | H01F 3/00 335/281 |

FOREIGN PATENT DOCUMENTS

| | | |
|---|---|---|
| JP | 2000-021628 A | 1/2000 |
| JP | 2002-340216 A | 11/2002 |
| JP | 2008-047567 A | 2/2008 |
| JP | 2009-127692 A | 6/2009 |
| JP | 2011-228568 A | 11/2011 |
| JP | 2013-024380 A | 2/2013 |

\* cited by examiner

SOLENOID DRIVE DEVICE

CROSS REFERENCE TO RELATED APPLICATIONS

This application is a National Stage of International Application No. PCT/JP2013/070346, filed Jul. 26, 2013, claiming priorities based on Japanese Patent Application Nos. 2012-167365, filed Jul. 27, 2012 and 2013-067521, filed Mar. 27, 2013, the contents of all of which are incorporated herein by reference in their entirety.

TECHNICAL FIELD

The present invention relates to solenoid drive devices including a cylindrical coil, a core placed radially inward of the cylindrical coil and having a bottomed cylindrical inner surface, and a plunger placed radially inward of the core such that the plunger can be displaced along the axial direction of the core according to the amount of current that is applied to the cylindrical coil.

BACKGROUND ART

An electromagnetic valve using such a solenoid drive device is disclosed in Japanese Patent Application Publication No. H11-287348 (JP H11-287348 A) (Patent Document 1). This electromagnetic valve includes a cylindrical coil (solenoid), a plunger that is capable of moving in the axial direction by current application to the solenoid, and a core as a magnetic body that attracts the plunger according to excitation of the solenoid. A yoke as a magnetic body having a cylindrical portion is provided radially inward of the solenoid. The core has an accommodating portion having a cylindrical inner peripheral surface, and the accommodating portion is placed radially inward of the solenoid. The yoke and the core are arranged next to each other in the moving direction of the plunger (axial direction) such that a cylindrical inner peripheral surface of a cylindrical portion of the yoke and a cylindrical inner peripheral surface of the core serve as sliding surfaces for the plunger. The yoke and the core are fixed to a cylindrical cover as a magnetic body, and the solenoid, the core, the plunger, the yoke, and the cover form a magnetic circuit. The electromagnetic valve is formed so that the core and the yoke have high magnetic resistance at a predetermined position in order to ensure the force that attracts the plunger by the core in this magnetic circuit. Specifically, clearance having high magnetic resistance is provided between the yoke and the core (Patent Document 1: FIGS. 1 and 2, Paragraphs [0018] to [0022], etc.)

A linear solenoid device disclosed in Japanese Patent Application Publication No. 2009-127692 (JP 2009-127692 A) (Patent Document 2) has a member as a nonmagnetic body between a first core corresponding to the core of Patent Document 1 and a second core corresponding to the yoke of Patent Document 1 (Patent Document 2: FIGS. 1 and 5, Paragraphs [0014] to [0017], etc.). That is, the linear solenoid device of Patent Document 2 has the member as the nonmagnetic body instead of the clearance between the core and the yoke of Patent Document 1. Since the member as the nonmagnetic body is provided, the inner peripheral surface of the first core, the inner peripheral surface of the second core, and the inner peripheral surface of the nonmagnetic body serve as a continuous sliding surface, and slidability is improved. Since relative positional accuracy between the first and second cores and relative positional accuracy between the plunger and the cores are also improved, magnetic loss is reduced.

In an electromagnetic actuator disclosed in Japanese Patent Application Publication No. 2000-21628 (JP 2000-21628 A) (Patent Document 3), the first core, the second core, and the nonmagnetic body in Patent Document 2 are formed as a core-integrated sleeve processed from a single ferromagnetic material. In this core-integrated sleeve, a modified part as a portion corresponding to the clearance of Patent Document 1 and the nonmagnetic body of Patent Document 2 is irradiated with a laser beam while being supplied with an austenite producing element (element that produces a nonmagnetic body or a weak magnetic body) such as, e.g., nickel. As a result, the modified part is alloyed into a nonmagnetic body or a weak magnetic body (Patent Document 3: FIG. 2, Paragraphs [0021] and [0022], etc.).

As described above, various structures are proposed in order to improve magnetic performance. The structure of Patent Document 2 described above can easily ensure positional accuracy of the magnetic body and the nonmagnetic body, and can achieve high magnetic performance. However, manufacturing cost is high because three parts are combined. On the other hand, since the structure of Patent Document 3 is formed by a single part, manufacturing cost is lower than the structure of Patent Document 2. However, it is not easy to accurately manage the range of alloys that are produced by laser beam radiation, the content of the austenite producing element, etc., and magnetic performance is less stable than the structure of Patent Document 2.

RELATED ART DOCUMENTS

Patent Documents

[Patent Document 1] Japanese Patent Application Publication No. H11-287348 (JP H11-287348 A)
[Patent Document 2] Japanese Patent Application Publication No. 2009-127692 (JP 2009-127692 A)
[Patent Document 3] Japanese Patent Application Publication No. 2000-21628 (JP 2000-21628 A)

SUMMARY OF THE INVENTION

Problem to be Solved by the Invention

In view of the above background, it is desired to implement an inexpensive solenoid drive device with high magnetic performance in which a portion accommodating a plunger and a portion attracting the plunger are integrated with a core as a ferromagnetic body.

Means for Solving the Problem

In view of the above problem, a solenoid drive device according to the present invention is a solenoid drive device including a cylindrical coil, a core placed radially inward of the cylindrical coil and having a bottomed cylindrical inner surface, and a plunger that can be displaced along an axial direction of the core and is subjected to biasing force in a direction in which the plunger is separated from a bottom surface portion of the core along the axial direction, and that is placed radially inward of the core, the solenoid drive device being configured so that, according to an amount of current that is applied to the cylindrical coil, the plunger can be displaced between a maximum stroke position as a position where a tip end surface of the plunger which faces the bottom surface portion is located farthest from the bottom surface portion due to the biasing force when no current is applied to the cylindrical coil and a minimum stroke position as a position where the tip end surface of the plunger is located closest to the bottom surface portion by current application to the cylindrical coil, characterized in that a biasing direction is a direction in which the plunger is biased by the biasing force along the axial direction, and an opposite biasing direction is a direction opposite to the biasing direction, a first imaginary boundary plane as an imaginary plane perpendicular to the axial direction is set in a boundary portion between a magnetic flux limiting portion and an increased diameter portion of the core so as to be located at the maximum stroke position in the axial direction or a position located on the biasing direction side of the maximum stroke position, and a second imaginary boundary plane as an imaginary plane perpendicular to the axial direction is set at the minimum stroke position in the axial direction or a position located on the biasing direction side of the minimum stroke position and on the opposite biasing direction side of the maximum stroke position, the magnetic flux limiting portion is located in a region on the biasing direction side of the first imaginary boundary plane, and is formed so as to have a smaller radial thickness than a region on the opposite biasing direction side of the first imaginary boundary plane, the increased diameter portion is formed so that its radial thickness is increased in a continuous or stepwise manner from the first imaginary boundary plane toward the opposite biasing direction side, an increased diameter reference line is a straight line connecting a first reference point and a second reference point, the first reference point being an intersection of the first imaginary boundary plane and a radial outer surface of the core in an axial section of the core taken along a plane including a central axis of the core, and the second reference point being an intersection of the second imaginary boundary plane and the radial outer surface of the core in the axial section, and the increased diameter portion has a recessed portion whose outer surface is recessed toward a radial inner surface with respect to the increased diameter reference line.

Since the recessed portion is provided in the increased diameter portion of the core, a path of a magnetic flux flowing in the increased diameter portion is narrowed, and the path of the magnetic flux in a direction perpendicular to the axial direction is reduced, and is deflected in a direction along the axial direction. As a result, the proportion of a component in the opposite biasing direction to force that is applied to the plunger is increased, and the force of the core attracting the plunger is increased. This structure can increase especially the attracting force at or near the minimum stroke position. Moreover, the first imaginary boundary plane is set in the boundary portion between the magnetic flux limiting portion and the increased diameter portion of the core so as to be located at the maximum stroke position in the axial direction or the position located on the side in the biasing direction of the maximum stroke position, and the second imaginary boundary plane is set at the minimum stroke position in the axial direction or the position located on the side in the biasing direction of the minimum stroke position and on the side in the opposite biasing direction of the maximum stroke position. Accordingly, the increased diameter reference line can be set in a region matching a stroke range of the plunger or in a region shifted from this region in the biasing direction. The increased diameter portion and the recessed portion can thus be placed at appropriate positions. That is, according to this configuration, the increased diameter portion has a characteristic structure in its outer shape, whereby an inexpensive solenoid drive device including an integrated core and having high magnetic performance can be implemented.

It is preferable that the recessed portion of the increased diameter portion be formed at a position including an intersection of a normal from a minimum stroke inner surface point to the increased diameter reference line and the increased diameter reference line in the axial section, or is formed on both the biasing direction side and the opposite biasing direction side of the intersection in the axial section, the minimum stroke inner surface point being a point on the radial inner surface of the core which corresponds to the minimum stroke position. The shortest distance from the minimum stroke inner surface point to the increased diameter reference line is the length of the normal from the minimum stroke inner surface point to the increased diameter reference line. In the case where the recessed portion is formed at the position including the intersection of this normal and the increased diameter reference line, the shortest distance between the minimum stroke inner surface point and the outer surface of the increased diameter portion is shorter than the length of the normal. Accordingly, at or near the minimum stroke position, the range in which the magnetic flux flows can be reduced, and the magnetic flux can be deflected in the direction along the axial direction. Moreover, the distance between the minimum stroke inner surface point and the outer surface of the increased diameter portion in the regions on both the side in the biasing direction and the side in the opposite biasing direction of the intersection of the normal and the increased diameter reference line is longer than the length of the normal. Forming the recessed portion in these regions can reduce the distance between the minimum stroke inner surface portion and the outer surface of the increased diameter portion. The range in which the magnetic flux flows can thus be reduced, and the magnetic flux can be deflected in the direction along the axial direction.

It is preferable that the increased diameter portion further have a protruding portion whose outer surface protrudes toward the radial outer surface beyond the increased diameter reference line. Providing such a protruding portion can compensate for a decrease in sectional area of the axial section of the increased diameter portion which is caused by forming the recessed portion in the increased diameter portion. This can ensure a large amount of magnetic flux flowing in the increased diameter portion. As a result, the attracting force of the core attracting the plunger is increased. This structure increases especially the attracting force at or near the maximum stroke position. According to this configuration, the attracting force can thus be increased at all the stroke positions from the minimum stroke position to the maximum stroke position. That is, the increased diameter portion has a characteristic structure in its outer shape, whereby an inexpensive solenoid drive device including an integrated core and having high magnetic performance can be implemented.

It is further preferable that the protruding portion and the recessed portion be formed so that an enlarged portion sectional area as a sectional area of the core between the first imaginary boundary plane and the second imaginary boundary plane in the axial section is larger than a reference sectional area in all of the axial sections along entire circumference, the reference sectional area being a sectional area of the core in a case where an outer surface of the increased diameter portion is formed by the increased diameter reference line. According to this configuration, since the recessed portion and the protruding portion are formed so that the enlarged portion sectional area is larger than the reference sectional area, a larger amount of magnetic flux flowing in the increased magnetic portion can be ensured. As a result, the attracting force of the core attracting the plunger is increased. This structure increases especially the attracting force at or near the maximum stroke position. According to this configuration, the attracting force can thus be increased at all the stroke positions from the minimum stroke position to the maximum stroke position. That is, the increased diameter portion has a characteristic structure in its outer shape and enlarged portion sectional area, whereby an inexpensive solenoid drive device including an integrated core and having high magnetic performance can be implemented.

It is preferable that the increased diameter portion have a first protruding portion as the protruding portion, the recessed portion, and a second protruding portion as the protruding portion in this order in the opposite biasing direction from the first imaginary boundary plane. At or near the minimum stroke position, the path of the magnetic flux flowing in the direction perpendicular to the axial direction is reduced due to the recessed portion, and is thus deflected in the direction along the axial direction. As a result, the proportion of the component in the opposite biasing direction to the force that is applied to the plunger is increased, and the attracting force of the core attracting the plunger is increased. At or near the maximum stroke position, however, magnetic resistance at or near the plunger is reduced due to the first protruding portion, and the magnetic flux flowing from the plunger to the core is thus increased. Providing the first protruding portion and the second protruding portion compensates for a decrease in sectional area of the increased diameter portion which is caused by the recessed portion, and increases the sectional area in the axial section of the increased diameter portion as a whole. Accordingly, the magnetic resistance is reduced, allowing the magnetic flux to flow satisfactorily. As a result, the attracting force at or near the maximum stroke position is also increased. Providing the protruding portion and the recessed portion in the increased diameter portion can thus increase the attracting force while maintaining stability with respect to the stroke.

It is preferable that the protruding portion adjoining the second imaginary boundary plane in the biasing direction have a first outer surface continuous with the radial outer surface of the core which is located on the opposite biasing direction side of the second imaginary boundary plane, and a second outer surface connected to an end on the biasing direction side of the first outer surface and formed in a shape of a truncated conical surface which has a larger tilt angle to the axial direction than the increased diameter reference line does. According to this configuration, the protruding portion can be easily formed by a commonly used processing method.

It is preferable that the first imaginary boundary plane be set at a position in the axial direction between the maximum stroke position and a position located away from the maximum stroke position by a distance equal to half a stroke of the plunger in the biasing direction, and the second imaginary boundary plane be set at a position in the axial direction between the minimum stroke position and a position located away from the minimum stroke position by a distance equal to half the stroke of the plunger in the biasing direction. According to this configuration, the first imaginary boundary plane is set at a relatively close position to the maximum stroke position which is separated up to half the stroke of the plunger from the maximum stroke position in the biasing direction, and the second imaginary boundary plane is set at a relatively close position to the minimum stroke position which is separated up to half the stroke of the plunger from the minimum stroke position in the biasing direction. The increased diameter reference line and the recessed portion can therefore be set at appropriate positions according to the stroke range of the plunger. Accordingly, an inexpensive solenoid drive device including an integrated core and having high magnetic performance can be implemented.

It is preferable that the plunger be configured to operate with a spool of an oil pressure control valve, the oil pressure control valve have, in an end region on the opposite biasing direction side in a stroke range of the spool, a non-control region where an output oil pressure is constant regardless of a position of the spool, and have, on the biasing direction side of the non-control region, a control region where the output oil pressure varies according to the position of the spool, and the second imaginary boundary plane is set at a position in the axial direction which is located away from the minimum stroke position in the biasing direction by a distance corresponding to a length in the axial direction of the non-control region. According to this configuration, the plunger can be placed so that the position of the tip end surface of the plunger in a state where the spool is located at an end on the opposite biasing direction side of the control region corresponds to a position of an end on the side in the opposite biasing direction of the increased diameter portion. Accordingly, the increased diameter portion can be placed as close to the side in the biasing direction as possible within a range that achieves a positional relation in which the control region corresponds to the increased diameter portion. This can ensure a large amount of magnetic flux flowing in the increased diameter portion and increase the attracting force while ensuring such characteristics that the attracting force of the core attracting the plunger is stable regardless of the stroke position of the spool in the control region.

Alternatively, it is preferable that the first imaginary boundary plane be set at the maximum stroke position in the axial direction, and the second imaginary boundary plane be set at the minimum stroke position in the axial direction. A solenoid drive device having such effects as described above can be implemented by this configuration as well.

In view of the above problem, a solenoid drive device according to an exemplary embodiment of the present invention is a solenoid drive device including a cylindrical coil, a core placed radially inward of the cylindrical coil and having a bottomed cylindrical inner surface, and a plunger that can be displaced along an axial direction of the core and is subjected to biasing force in a direction in which the plunger is separated from a bottom surface portion of the core along the axial direction, and that is placed radially inward of the core, the solenoid drive device being configured so that, according to an amount of current that is applied to the cylindrical coil, the plunger can be displaced between a maximum stroke position as a position where a tip end surface of the plunger which faces the bottom surface portion is located farthest from the bottom surface portion due to the biasing force when no current is applied to the cylindrical coil and a minimum stroke position as a position where the tip end surface of the plunger is located closest to the bottom surface portion by current application to the cylindrical coil, characterized in that a biasing direction is a direction in which the plunger is biased by the biasing force along the axial direction, and an opposite biasing direction is a direction opposite to the biasing direction, the core includes a magnetic flux limiting portion that is located in a region on the biasing direction side of the maximum stroke position and that is formed so as to have a smaller radial thickness than a region on the opposite biasing direction side of the maximum stroke position, and an increased diameter portion that is formed so that its radial thickness is increased toward the opposite biasing direction side from an end on the opposite biasing direction side of the magnetic flux limiting portion, an increased diameter reference line is a straight line connecting, in an axial section of the core taken along a plane including a central axis of the core, a maximum stroke outer surface point as a point on a radial outer surface of the core which corresponds to the maximum stroke position and a minimum stroke outer surface point as a point on the radial outer surface of the core which corresponds to the minimum stroke position, the increased diameter portion has a protruding portion whose outer surface protrudes toward the radial outer surface beyond the increased diameter reference line, and a recessed portion whose outer surface is recessed toward a radial inner surface with respect to the increased diameter reference line, and the protruding portion and the recessed portion are formed so that an enlarged portion sectional area as a sectional area of the core between the maximum stroke position and the minimum stroke position in the axial section is larger than a reference sectional area in all of the axial sections along entire circumference, the reference sectional area being a sectional area of the core in a case where an outer surface of the increased diameter portion is formed by the increased diameter reference line.

Since the recessed portion is provided in the increased diameter portion of the core, a path of a magnetic flux flowing in the increased diameter portion is narrowed, and the path of the magnetic flux in a direction perpendicular to the axial direction is reduced, and is deflected in a direction along the axial direction. As a result, the proportion of a component in the opposite biasing direction to force that is applied to the plunger is increased, and the force of the core attracting the plunger is increased. This structure can increase especially the attracting force at or near the minimum stroke position. On the other hand, the protruding portion compensates for a decrease in enlarged portion sectional area which is caused by providing the recessed portion. According to this configuration, the recessed portion and the protruding portion are formed so that the enlarged portion sectional area is larger than the reference sectional area. This can ensure a large amount of magnetic flux flowing in the increased diameter portion. As a result, the attracting force of the core attracting the plunger is increased. This structure increases especially the attracting force at or near the maximum stroke position. According to this configuration, the attracting force can thus be increased at all the stroke positions from the minimum stroke position to the maximum stroke position. That is, the increased diameter portion has a characteristic structure in its outer shape and enlarged portion sectional area, whereby an inexpensive solenoid drive device including an integrated core and having high magnetic performance can be implemented.

It is preferable that the increased diameter portion have a first protruding portion as the protruding portion, the recessed portion, and a second protruding portion as the protruding portion in this order in the opposite biasing direction from the end on the opposite biasing direction side of the magnetic flux limiting portion. At the minimum stroke position, the path of the magnetic flux flowing in the direction perpendicular to the axial direction is reduced due to the recessed portion, and is thus deflected in the direction along the axial direction. As a result, the proportion of the component in the opposite biasing direction to the force that is applied to the plunger is increased, and the attracting force of the core attracting the plunger is increased. At the maximum stroke position, however, magnetic resistance at or near the plunger is reduced due to the first protruding portion, and the magnetic flux flowing from the plunger to the core is thus increased. Providing the first protruding portion and the second protruding portion compensates for a decrease in enlarged portion sectional area which is caused by the recessed portion, and increases the enlarged portion sectional area as a whole. Accordingly, the magnetic resistance is reduced, allowing the magnetic flux to flow satisfactorily. As a result, the attracting force at or near the maximum stroke position is also increased. Providing the protruding portion and the recessed portion in the increased diameter portion can thus increase the attracting force while maintaining stability with respect to the stroke.

It is preferable that the recessed portion of the increased diameter portion be formed at a position including an intersection of a normal from a minimum stroke inner surface point to the increased diameter reference line and the increased diameter reference line in the axial section, or is formed on both the biasing direction side and the opposite biasing direction side of the intersection in the axial section, the minimum stroke inner surface point being a point on the radial inner surface of the core which corresponds to the minimum stroke position. The shortest distance from the minimum stroke inner surface point to the increased diameter reference line is the length of the normal from the minimum stroke inner surface point to the increased diameter reference line. In the case where the recessed portion is formed at the position including the intersection of this normal and the increased diameter reference line, the shortest distance between the minimum stroke inner surface point and the outer surface of the increased diameter portion is shorter than the length of the normal. Accordingly, at the minimum stroke position, the range in which the magnetic flux flows can be reduced, and the magnetic flux can be deflected in the direction along the axial direction. Moreover, the distance between the minimum stroke inner surface point and the outer surface of the increased diameter portion in the regions on both the biasing direction side and the opposite biasing direction side of the intersection of the normal and the increased diameter reference line is longer than the length of the normal. Forming the recessed portion in these regions can reduce the distance between the minimum stroke inner surface portion and the outer surface of the increased diameter portion. The range in which the magnetic flux flows can thus be reduced, and the magnetic flux can be deflected in the direction along the axial direction.

It is preferable that the protruding portion adjoining the recessed portion in the opposite biasing direction have a first outer surface continuous with the radial outer surface of the core which is located on the opposite biasing direction side of the minimum stroke position, and a second outer surface extending from an end on the opposite biasing direction side of the recessed portion to the first outer surface along a direction perpendicular to the axial direction. According to this configuration, the sectional area of the protruding portion can be increased to a maximum extent within a range in which the protruding portion can be easily processed by a commonly used processing method. According to this configuration, the enlarged portion sectional area in the axial section can therefore be increased.

MODES FOR CARRYING OUT THE INVENTION

1. First Embodiment

Figure 1:
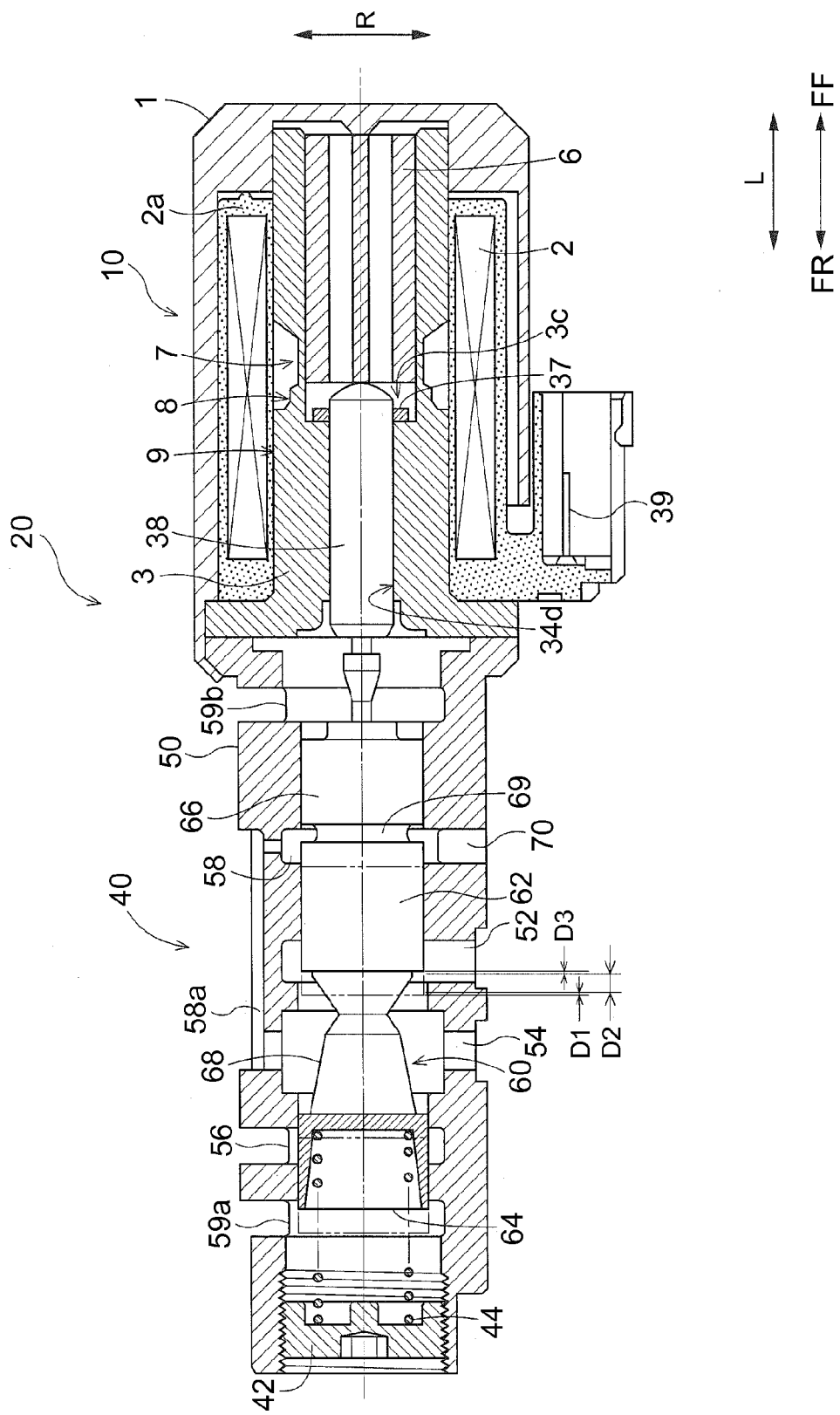
FIG. 1 is an axial sectional view of an electromagnetic valve including a solenoid drive device according to a first embodiment.
Figure 2:
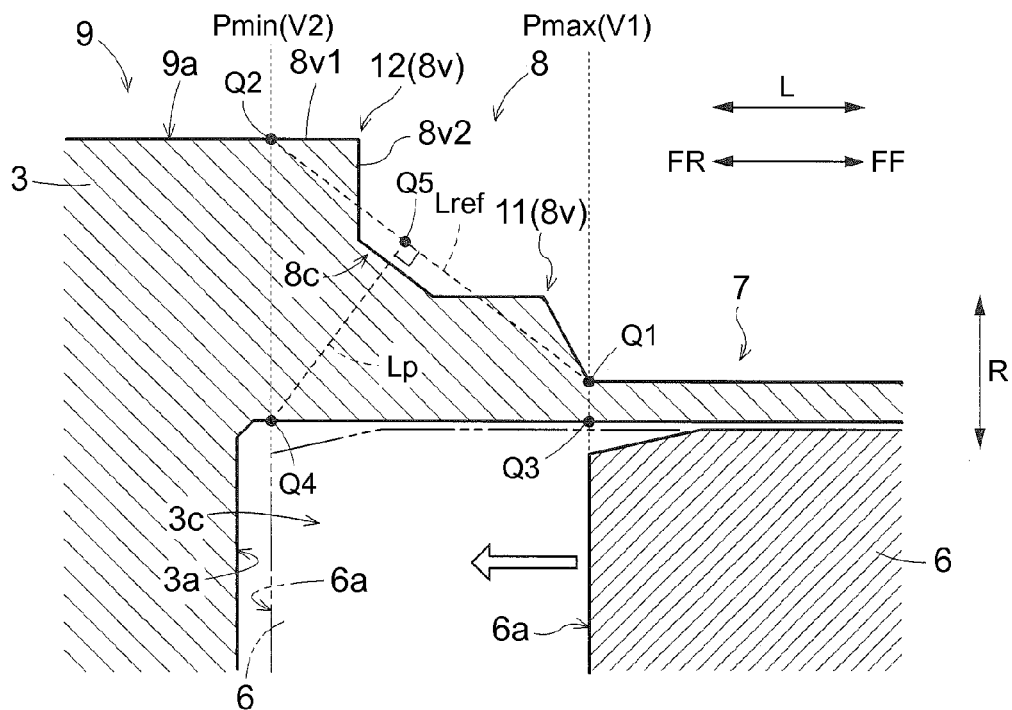
FIG. 2 is a partial enlarged view of a part at or near an increased diameter portion in axial section according to the first embodiment.

A first embodiment of the present invention will be described based on the accompanying drawings by using an example in which a solenoid drive device according to an exemplary embodiment of the present invention is applied to an electromagnetic valve. FIG. 1 is an axial sectional view of an electromagnetic valve 20 including a solenoid drive device 10, and FIG. 2 is a partial enlarged view of a part at or near an increased diameter portion denoted by reference numeral "8" in FIG. 1 and described below. The electromagnetic valve 20 shown in section in FIG. 1 is configured as, e.g., a linear solenoid valve that is used for hydraulic control of a clutch or brake incorporated in an automatic transmission. As shown in FIG. 1, the electromagnetic valve 20 includes the solenoid drive device 10, and a pressure regulating valve portion 40 that is driven by the solenoid drive device 10 to regulate a received oil pressure and output the regulated oil pressure. In the present embodiment, this pressure regulating valve portion 40 corresponds to the oil pressure control valve in the present invention.

The solenoid drive device 10 includes a case 1 as a cylindrical member with a bottom (bottomed cylindrical member), a cylindrical coil 2 placed inward of the case 1 in a radial direction R, a core 3 placed inward of the cylindrical coil 2 in the radial direction R, a plunger 6 placed inward of the core 3 in the radial direction R, and a shaft 38 provided coaxially with the plunger 6. Each of the case 1, the core 3, and the plunger 6 is made of a ferromagnetic material such as high purity iron. The plunger 6 has its outer surface plated with a nonmagnetic material such as, e.g., nickel or phosphorus, so that a nonmagnetic layer is formed.

The cylindrical coil 2 is formed by winding a coated conductive wire around an insulating bobbin 2a. The core 3 has a bottomed cylindrical inner surface, and the internal space of the cylindrical portion serves as a plunger accommodating portion 3c as a space that accommodates the plunger 6. The plunger 6 can be displaced along an axial direction L of the core 3, and is subjected to biasing force in the direction (biasing direction FF) in which the plunger 6 is separated from a bottom surface portion 3a (see FIG. 2) of the core 3 along the axial direction L. According to the amount of current that is applied to the cylindrical coil 2, the plunger 6 can be displaced between a maximum stroke position Pmax as a position where a tip end surface 6a (see FIG. 3) of the plunger 6 which faces the bottom surface portion 3a is located farthest from the bottom surface portion 3a due to the biasing force when no current is applied to the cylindrical coil 2 and a minimum stroke position Pmin as a position where the tip end surface 6a of the plunger 6 is located closest to the bottom surface portion 3a by current application to the cylindrical coil 2. The cylindrical coil 2 is connected to a connector portion 39 formed on the outer peripheral portion of the case 1, and a current is applied to the cylindrical coil 2 via this connector portion 39.

The bottom surface portion 3a of the core 3 has a through hole extending through the bottom of the core 3 in the axial direction L. The bottom of the core 3 has the same length as that of the plunger accommodating portion 3c in the axial direction L, and this through hole serves as a shaft accommodating portion 34d that accommodates the shaft 38. The shaft 38 can be displaced in the axial direction L with the inner peripheral surface of the shaft accommodating portion 34d serving as a sliding surface. The shaft 38 has its one end in contact with the plunger 6, and the shaft 38 and the plunger 6 slide together. In other words, the shaft 38 and the plunger 6 are configured to operate together.

The pressure regulating valve portion 40 includes a cylindrical sleeve 50, a spool 60 placed inward of the sleeve 50 in the radial direction R and having an end in the axial direction L which contacts the end in the axial direction L of the shaft 38, an end plate 42 fixed to the sleeve 50 in the end in the axial direction L of the sleeve 50, and a spring 44 placed between the end plate 42 and the spool 60. The spring 44 biases the spool 60 toward the solenoid drive device 10 (biasing direction FF). The position where the end plate 42 is fixed to the sleeve 50 in the axial direction L is adjustable, and the biasing force can be adjusted by adjustment of the position where the end plate 42 is fixed. The spool 60 contacts the shaft 38 at the end in the axial direction L of the spool 60 which is located closer to the solenoid drive device 10. As described above, the shaft 38 is in contact with the plunger 6 of the solenoid drive device 10. The biasing force of the spring 44 is therefore applied to the plunger 6 along the axial direction L. The plunger 6 and the spool 60 are thus configured to operate together. FIG. 1 shows the state where the plunger 6 is biased and displaced to a maximum extent in the biasing direction FF along the axial direction L by the biasing force of the spring 44 (the state where the tip end surface 6a of the plunger 6 is located at the maximum stroke position Pmax).

As described above, the plunger 6 is displaced in an opposite biasing direction FR as the direction opposite to the biasing direction FF by current application to the cylindrical coil 2. A ring-shaped spacer 37 made of a nonmagnetic material is placed so that the tip end surface 6a does not directly contact the core 3 when the plunger 6 is displaced to a maximum extent in the opposite biasing direction FR. This spacer 37 prevents the plunger 6 from not being separated from the core 3 due to residual magnetism that occurs when current application to the cylindrical coil 2 is stopped. The minimum stroke position Pmin is the position of the tip end surface 6a in the state where the plunger 6 is displaced to a maximum extent in the opposite biasing direction FR against the biasing force and the tip end surface 6a is in contact with the spacer 37 by attracting force that is generated by current application to the cylindrical coil 2 (see FIG. 2).

As described above, each of the maximum stroke position Pmax and the minimum stroke position Pmin is the position where the plunger 6 contacts a member that restricts displacement of the plunger 6 in the axial direction L. The maximum stroke position Pmax and the minimum stroke position Pmin in the core 3 can therefore vary among individuals due to a mechanical error etc. The maximum stroke position Pmax and the minimum stroke position Pmin which are defined in the present invention are the positions including such an error range.

The sleeve 50 is provided with an inlet port 52, an outlet port 54, a drain port 56, and a feedback port 58 as openings in the internal space. The inlet port 52 is a port through which hydraulic oil flows into the sleeve 50. The outlet port 54 is a port through which the hydraulic oil is discharged from the sleeve 50. The drain port 56 is a port through which the hydraulic oil is drained from the sleeve 50. The feedback port 58 is a port through which the hydraulic oil discharged through the outlet port 54 flows onto the spool 60 via a feedback oil passage 58a that is formed by the inner surface of a valve body included in the electromagnetic valve 20 and the outer surface of the sleeve 50. Respective ends in the axial direction L of the sleeve 50 have discharge holes 59a, 59b that discharge the hydraulic oil leaking from between the inner peripheral surface of the sleeve 50 and the outer peripheral surface of the spool 60 as the spool 60 slides.

The spool 60 is formed as a shaft-like member that is inserted in the sleeve 50. As shown in FIG. 1, the spool 60 includes three cylindrical lands 62, 64, 66 having substantially the same outer diameter as the inner diameter of the sleeve 50, a communicating portion 68 allowing these lands to communicate with each other, and a connecting portion 69 forming a feedback chamber 70. The communicating portion 68 connects the land 62 and the land 64 and allows the inlet port 52, the outlet port 54, and the drain port 56 to communicate with each other. The communicating portion 68 has a smaller outer diameter than the land 62 and the land 64, and is tapered so that its outer diameter decreases as the distance from each of the land 62 and the land 64 along the axial direction L increases. The connecting portion 69 connects the land 62 and the land 66 and forms together with an inner wall of the sleeve 50 the feedback chamber 70 that applies a feedback force to the spool 60.

With current application to the cylindrical coil 2 being stopped (when no current is applied), the spool 60 is displaced to a maximum extent in the biasing direction FF by the biasing force of the spring 44, as shown by solid line in FIG. 1. At this time, the inlet port 52 and the outlet port 54 communicate with each other through the communicating portion 68, and the outlet port 54 and the drain port 56 are disconnected from each other by the land 64. The outlet port 54 is thus subjected to an oil pressure.

When a current is applied to the cylindrical coil 2, the plunger 6 is attracted in the opposite biasing direction FR by attracting force generated according to the amount of current applied, that is, the magnitude of the current that is applied to the cylindrical coil 2. Accordingly, the shaft 38 contacting the plunger 6 is displaced in the opposite biasing direction FR, and the spool 60 contacting the shaft 38 is displaced in the opposite biasing direction FR. At this time, the spool 60 is stopped at the position where the force attracting the plunger 6, the spring force of the spring 44, and the feedback force applied from the feedback port 58 to the spool 60 are balanced. The more the spool 60 is displaced in the opposite biasing direction FR, the more the opening area of the inlet port 52 is decreased, and the more the opening area of the drain port 56 is increased. As the positions of the lands are partially shown by two-dot chain line in FIG. 1, when the spool 60 is moved to a maximum extent in the opposite biasing direction FR, the inlet port 52 is completely closed by the land 62, and the outlet port 54 and the drain port 56 communicate with each other. The outlet port 54 is thus no longer subjected to the oil pressure.

As described above, the plunger 6 is attracted in the opposite biasing direction FR by the attracting force that is generated according to the amount of current applied to the cylindrical coil 2. Accordingly, by improving magnetic efficiency of the solenoid drive device 10, required attracting force can be ensured by using a smaller solenoid drive device 10. As a result, a smaller electromagnetic valve 20 can be achieved, or an electromagnetic valve 20 that operates with less power consumption can be achieved.

The solenoid drive device 10 according to an exemplary embodiment of the present invention is characterized in the configuration of the core 3 which improves magnetic efficiency, especially the configuration of the increased diameter portion 8 provided in the core 3. In order to define the shape of such a core 3, two imaginary planes perpendicular to the axial direction L, namely a first imaginary boundary plane V1 and a second imaginary boundary plane V2, are set for the solenoid drive device 10. The first imaginary boundary plane V1 is set at the maximum stroke position Pmax in the axial direction L or a position located on the biasing direction FF side of the maximum stroke position Pmax. As described below, the first imaginary boundary plane V1 is set in the boundary portion between a magnetic flux limiting portion 7 and the increased diameter portion 8 of the core 3. The second imaginary boundary plane V2 is set at the minimum stroke position Pmin in the axial direction L or a position located on the biasing direction FF side of the minimum stroke position Pmin and on the opposite biasing direction FR side of the maximum stroke position Pmax. In the present embodiment, the first imaginary boundary plane V1 is set at the maximum stroke position Pmax in the axial direction L (V1=Pmax), and the second imaginary boundary plane V2 is set at the minimum stroke position Pmin in the axial direction L (V2=Pmin). This will be described in detail below.

As described above, FIG. 2 is a partial enlarged view of a part at or near the increased diameter portion shown by reference numeral "8" in FIG. 1. As shown in FIGS. 1 and 2, the core 3 includes the magnetic flux limiting portion 7, the increased diameter portion 8, and a base portion 9. In order to ensure the force attracting the plunger 6 by the core 3 in a magnetic circuit, the magnetic flux limiting portion 7 is configured so that the core 3 has increased magnetic resistance at a predetermined position. Specifically, the magnetic flux limiting portion 7 is located in a region on the biasing direction FF side of the maximum stroke position Pmax (first imaginary boundary plane V1), and is formed so as to have a smaller thickness in the radial direction R than a region on the opposite biasing direction FR side of the maximum stroke position Pmax. The increased diameter portion 8 is formed so that its thickness in the radial direction R is increased in a continuous or stepwise manner from the end on the opposite biasing direction FR side of the magnetic flux limiting portion 7 (first imaginary boundary plane V1) toward the opposite biasing direction FR side. In this example, the maximum stroke position Pmax (first imaginary boundary plane V1) is therefore located at the boundary between the magnetic flux limiting portion 7 and the increased diameter portion 8. The base portion 9 is a portion located on the opposite biasing direction FR side of the bottom surface portion 3a of the core 3 that is a portion formed in a bottomed cylindrical shape. The core 3 has substantially the same outer diameter in a region other than the magnetic flux limiting portion 7 and the increased diameter portion 8 in the axial direction L. The base portion 9 has a larger thickness than the average thickness of the increased diameter portion 8 and the thickness of the magnetic flux limiting portion 7 in the radial direction R.

As shown in FIG. 2, the increased diameter portion 8 has a recessed portion 8c whose outer surface is recessed toward the inner surface in the radial direction R with respect to an increased diameter reference line Lref described below. In the present embodiment, the increased diameter portion 8 further has protruding portions 8v whose outer surfaces protrude toward the outer surface in the radial direction R beyond the increased diameter reference line Lref. In the form shown by way of example in FIG. 2, the increased diameter portion 8 has a first protruding portion 11 as the protruding portion 8v, the recessed portion 8c, and a second protruding portion 12 as the protruding portion 8v in this order in the opposite biasing direction FR from the end on the opposite biasing direction FR side of the magnetic flux limiting portion 7 (first imaginary boundary plane V1). In the form shown by way of example in FIG. 2, the recessed portion 8c is formed at a position including an intersection Q5 of a normal Lp from a point "Q4" to the increased diameter reference line Lref and the increased diameter reference line Lref in axial section. Moreover, in the form shown by way of example in FIG. 2, the protruding portion 8v adjoining the recessed portion 8c in the opposite biasing direction FR (in this example, the second protruding portion 12) has a first outer surface 8v1 continuous with a radial outer surface (9a) of the core 3 (base portion 9) which is located on the opposite biasing direction FR side of the minimum stroke position Pmin (second imaginary boundary plane V2), and a second outer surface 8v2 extending along a direction perpendicular to the axial direction L from the end on the opposite biasing direction FR side of the recessed portion 8c to the first outer surface 8v1. In other words, the protruding portion 8v adjoining the second imaginary boundary plane V2 in the biasing direction FF (in this example, the second protruding portion 12) has the first outer surface 8v1 continuous with the radial outer surface (9a) of the core 3 (base portion 9) which is located on the opposite biasing direction FR side of the second imaginary boundary plane V2, and the second outer surface 8v2 connected to the end on the biasing direction FF side of the first outer surface 8v1 and extending along the direction perpendicular to the axial direction L.

The increased diameter reference line Lref is a straight line connecting a first reference point Q1 and a second reference point Q2 in axial section of the core 3 taken along a plane including the central axis of the core 3. The first reference point Q1 is an intersection of the first imaginary boundary plane V1 and the outer surface in the radial direction R of the core 3 in the axial section of the core 3. In the present embodiment, since the first imaginary boundary plane V1 is set as the maximum stroke position Pmax, the first reference point Q1 is a maximum stroke outer surface point as a point on the outer surface in the radial direction R of the core 3 which corresponds to the maximum stroke position Pmax. The second reference point Q2 is an intersection of the second imaginary boundary plane V2 and the outer surface in the radial direction R of the core 3 in the axial section of the core 3. In the present embodiment, since the second imaginary boundary plane V2 is set as the minimum stroke position Pmin, the second reference point Q2 is a minimum stroke outer surface point as a point on the outer surface in the radial direction R of the core 3 which corresponds to the minimum stroke position Pmin. A point "Q3" in FIG. 2 is a point on the inner surface in the radial direction R of the core 3 which corresponds to the maximum stroke position Pmax, and is referred to as the "maximum stroke inner surface point Q3." A point "Q4" is a point on the inner surface in the radial direction R of the core 3 which corresponds to the minimum stroke position Pmin, and is referred to as the "minimum stroke inner surface point Q4."

Figure 3:
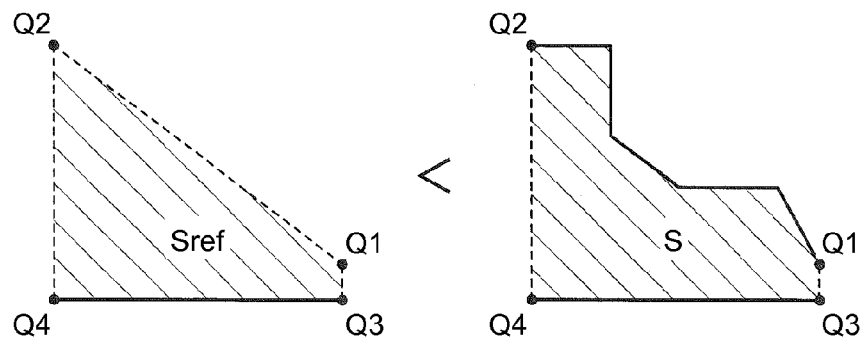
FIG. 3 is a diagram showing comparison between the sectional area of the increased diameter portion (enlarged portion sectional area) and the reference sectional area according to the first embodiment.

As shown in FIG. 3, the protruding portions 8v and the recessed portion 8c are formed so that an enlarged portion sectional area S as a sectional area of the core 3 between the maximum stroke position Pmax (first imaginary boundary plane V1) and the minimum stroke position Pmin (second imaginary boundary plane V2) in the axial section is larger than a reference sectional area Sref. The reference sectional area Sref is a sectional area of the core 3 in the case where the outer surface of the increased diameter portion 8 is formed by the increased diameter reference line Lref. In this example, the reference sectional area Sref is the area of a quadrilateral connecting Q1, Q2, Q3, and Q4, as shown in FIG. 3. The axial section is a section of the core 3 taken along a plane including the central axis of the core 3, and therefore can be set infinitely in a circumferential direction of the core 3. The enlarged portion sectional area S is larger than the reference sectional area Sref in all of the axial sections along the entire circumference.

Figure 4:
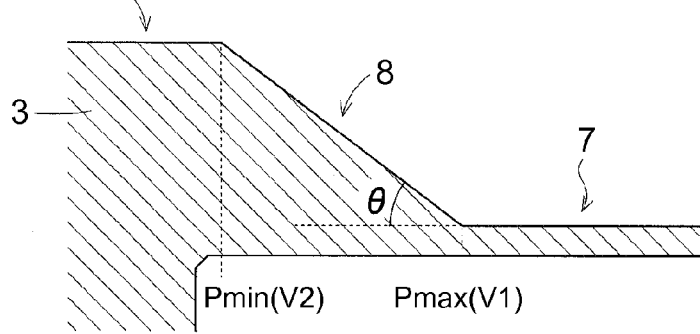
FIG. 4 is a partial enlarged view in axial section showing a typical structure of the increased diameter portion according to the first embodiment.
Figure 5:
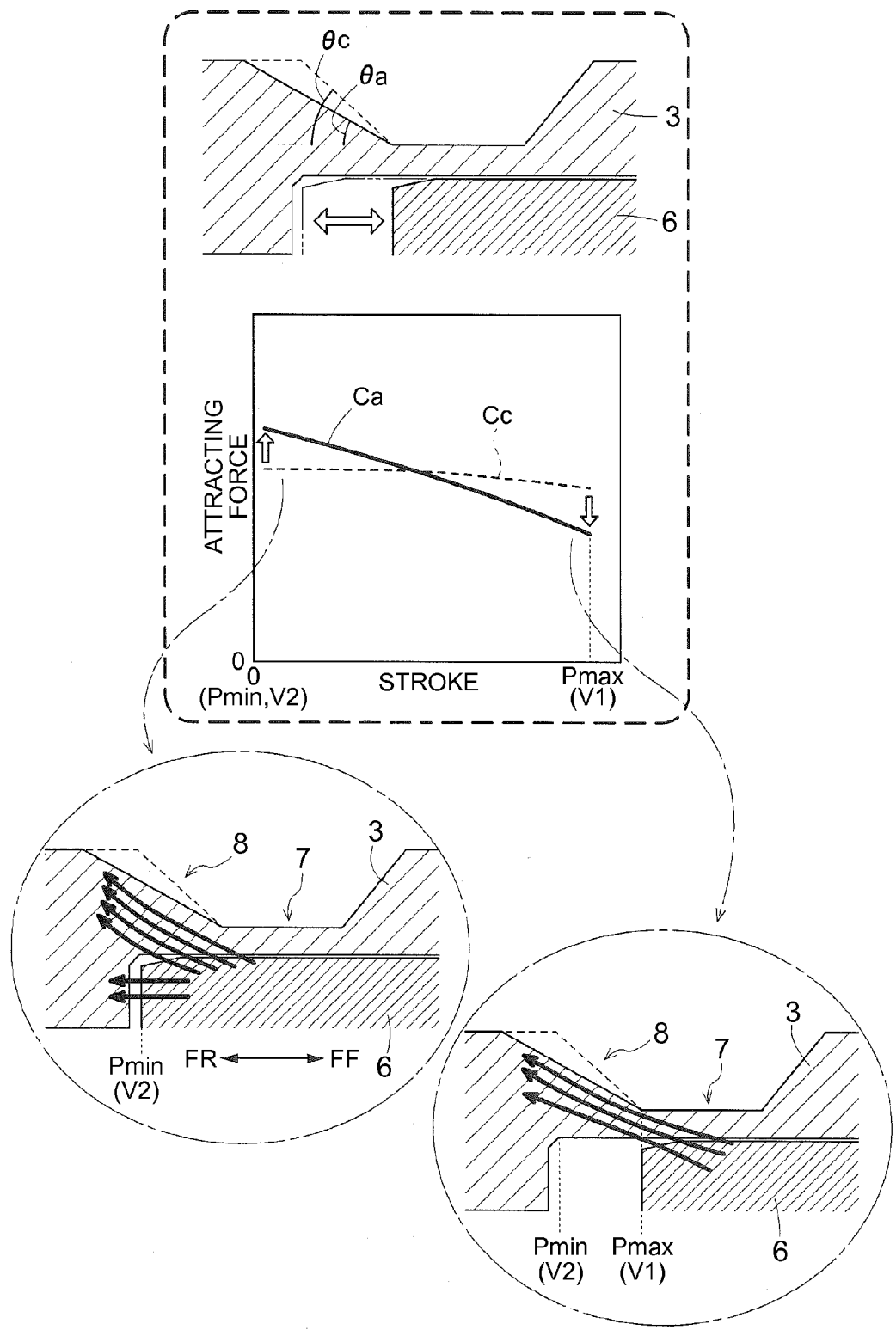
FIG. 5 is a diagram schematically showing the relation between the increased angle and the magnetic performance in the increased diameter portion according to the first embodiment.

The relation between the structure of the increased diameter portion 8 and the magnetic performance (characteristics of attracting force) will be described with reference to FIGS. 4 to 7. FIG. 4 shows the core 3 in the case where the outer surface of the increased diameter portion 8 is formed by a straight line such as, e.g., the increased diameter reference line Lref in axial section. In this example, an increased diameter angle θ denotes an angle between the outer surface of the increased diameter portion 8 extending from the maximum stroke position Pmax (first imaginary boundary plane V1) toward the minimum stroke position Pmin (second imaginary boundary plane V2) and the axial direction L in the axial section. FIG. 5 schematically shows magnetic performance and characteristics of attracting force based on the magnetic performance in the case where the increased diameter angle θ is "θa" that is smaller than an ideal angle "θc." FIG. 6 schematically shows magnetic performance and characteristics of attracting force based on the magnetic performance in the case where the increased diameter angle θ is "θb" that is larger than the ideal angle "θc." In the case where the increased diameter angle θ is the ideal angle "θ," the outer surface of the increased diameter portion 8 in axial section preferably substantially matches the increased diameter reference line Lref.

Figure 6:
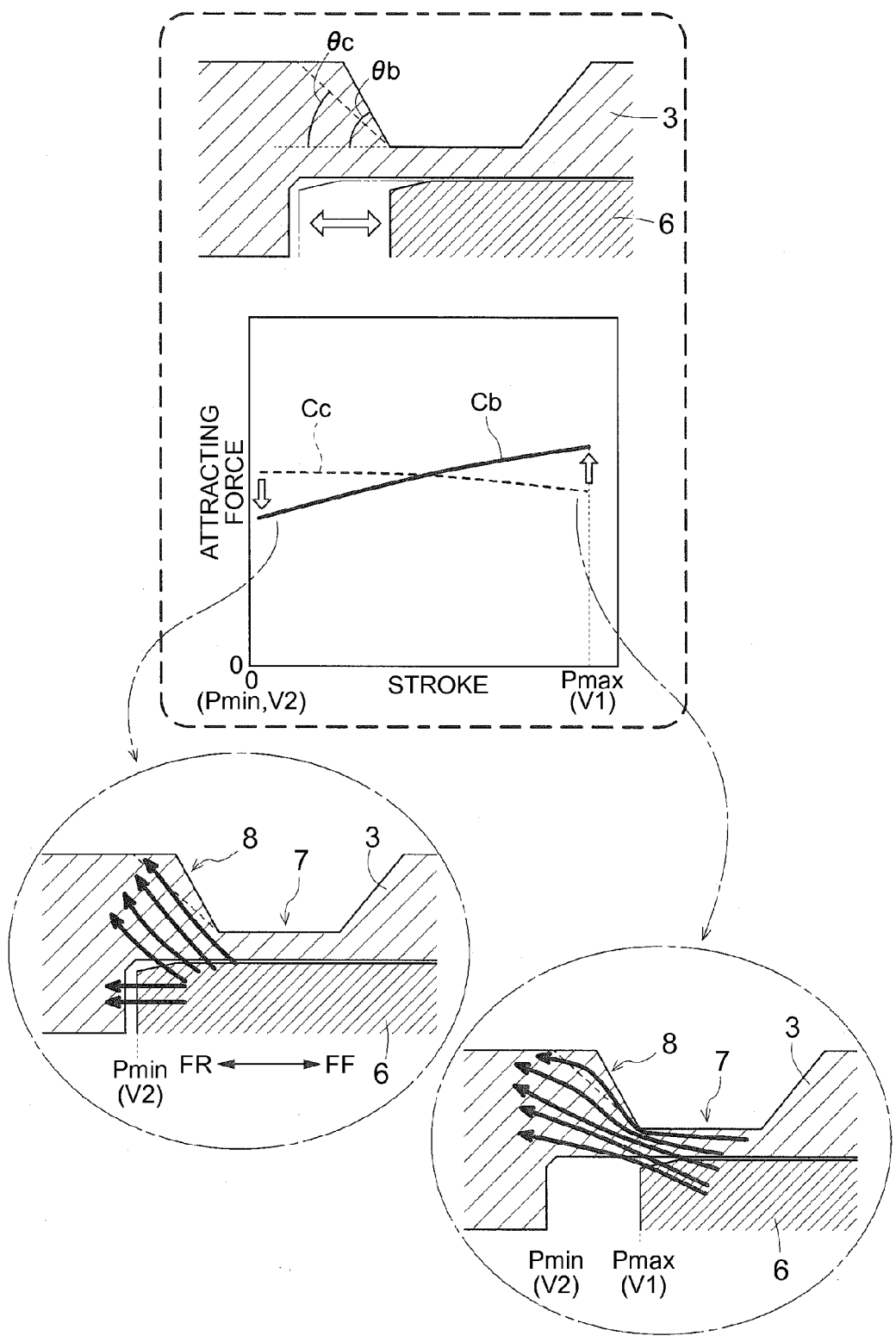
FIG. 6 is a diagram schematically showing the relation between the increased angle and the magnetic performance in the increased diameter portion according to the first embodiment.

The graphs in the middle of FIGS. 5 and 6 show the relation between the stroke as the distance between the tip end surface 6a of the plunger 6 and the bottom surface portion 3a of the core 3 and the attracting force that is applied to the plunger 6. In the graphs, the value of the stroke at the minimum stroke position Pmin (second imaginary boundary plane V2) is "0," and the value of the stroke at the maximum stroke position Pmax (first imaginary boundary plane V1) is a maximum possible value. In these graphs, a characteristic "Cc" shown by broken line represents a characteristic in the case where the increased diameter angle θ is the ideal angle "θc." That is, ideal characteristics are such characteristics that the attracting force is substantially constant regardless of the stroke, and "θc" is the increased diameter angle θ that can implement such characteristics. If the attracting force is substantially constant, the attracting force responds substantially linearly to the amount of current that is applied to the cylindrical coil 2. Accordingly, the solenoid drive device 10 and the electromagnetic valve 20 can be easily accurately controlled.

An example in which the increased diameter angle "θa" is "θc>θa" will be described with reference to FIG. 5. In this case, at or near the minimum stroke position Pmin, the direction of a magnetic flux passing through the plunger 6 and the core 3 is close to the axial direction L. As a result, the proportion of the component in the opposite biasing direction FR along the axial direction L to the force that is applied to the plunger 6 is increased, and the attracting force is increased. At or near the maximum stroke position Pmax, however, the enlarged portion sectional area S of the increased diameter portion 8 is reduced. Accordingly, the magnetic resistance is increased, the magnetic flux passing through the core 3 is reduced, and the attracting force is reduced. As a result, as shown by solid line in FIG. 5, the attracting force exhibits such a characteristic "Ca" that the attracting force is proportional to the stroke with a negative proportionality constant, and the attracting force is not stable with respect to the stroke. In the case where the solenoid drive device 10 having such characteristics is applied to the electromagnetic valve 20, the attracting force decreases as the plunger 6 moves toward the maximum stroke position Pmax. Accordingly, when the plunger 6 moves toward the maximum stroke position Pmax by hydraulic vibrations, the time required for the plunger 6 to return to its original position is increased, and convergence for hydraulic vibrations tends to be degraded.

An example in which the increased diameter angle "θb" is "θc<θb" will be described with reference to FIG. 6. In this case, at or near the minimum stroke position Pmin, the direction of the magnetic flux passing through the plunger 6 and the core 3 is close to a direction perpendicular to the axial direction L. As a result, the proportion of the component in the opposite biasing direction FR along the axial direction L to the force that is applied to the plunger 6 is reduced, and the attracting force is reduced. At or near the maximum stroke position Pmax, however, the enlarged portion sectional area S of the increased diameter portion 8 is increased. Accordingly, the magnetic resistance is reduced, the magnetic flux flowing in the core 3 is reduced, and the attracting force is increased. As a result, as shown by solid line in FIG. 6, the attracting force exhibits such a characteristic "Cb" that the attracting force is proportional to the stroke with a positive proportionality constant, and the attracting force is not constant with respect to the stroke. In the case where the solenoid drive device 10 having such characteristics is applied to the electromagnetic valve 20, the biasing force of the spring 44 need be increased in view of the balance with the large attracting force at or near the maximum stroke position Pmax, and responsiveness to a command to move the plunger 6 is degraded.

The ideal increased diameter angle "θc" is an angle that is set in the range of "θa<θc<θb" based on such a background. This angle "θc" is determined by experiments and simulations. Moreover, energy saving due to increase in attracting force and suppression in the amount of current that is applied can be implemented by improving the magnetic performance. As described above, providing the protruding portions 8v and the recessed portion 8c improves the increased diameter portion 8 of the solenoid drive device 10 according to the present invention over the case where the outer surface of the increased diameter portion 8 is formed by a conical surface having the ideal increased diameter angle "θc" (the case where the outer surface of the increased diameter portion 8 is formed by a straight line having the ideal increased diameter angle "θc" in axial section).

Figure 7:
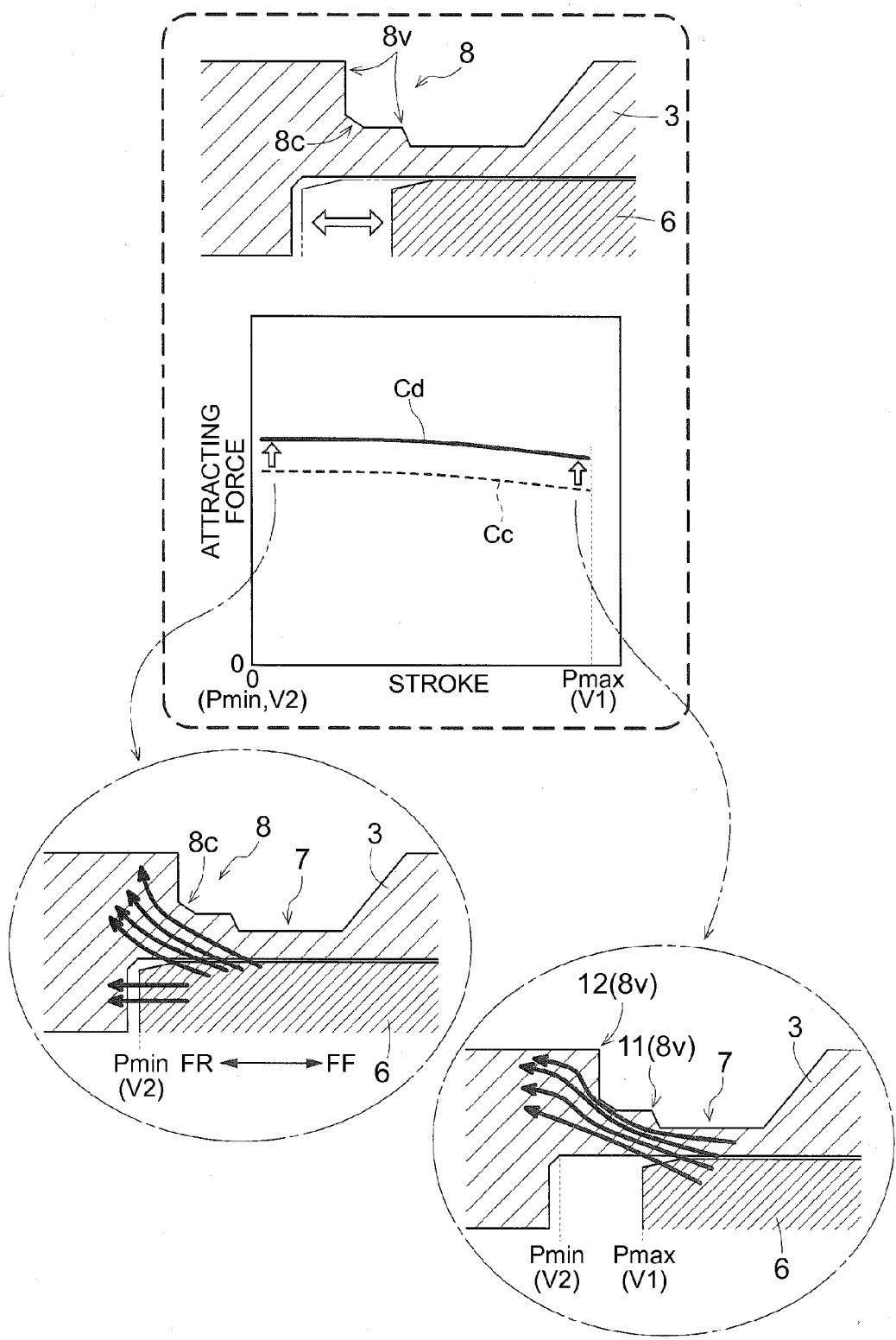
FIG. 7 is an illustration showing the principle of improvement in magnetic performance in the increased diameter portion according to the first embodiment.

Like FIGS. 5 and 6, the graph in the middle of FIG. 7 shows the relation between the stroke as the distance between the tip end surface 6a of the plunger 6 and the bottom surface portion 3a of the core 3 and the attracting force that is applied to the plunger 6. Like FIGS. 5 and 6, the characteristic "Cc" shown by broken line in the graph is a characteristic in the case where the increased diameter angle θ is the ideal angle "θc." A characteristic "Cd" shown by solid line in FIG. 7 is a characteristic in the case where the outer surface of the increased diameter portion 8 has the protruding portions 8v and the recessed portion 8c. In the characteristic "Cd," the attracting force is larger in the entire region of the stroke, as compared to the characteristic "Cc." The attracting force is substantially constant regardless of the stroke, and increase in attracting force is implemented while maintaining stability.

As shown in FIG. 7, at or near the minimum stroke position Pmin, the path of the magnetic flux flowing from the plunger 6 to the core 3 is narrowed due to the recessed portion 8c. Specifically, the path of the magnetic flux in the direction perpendicular to the axial direction L is reduced, and is deflected in a direction close to the axial direction L. As a result, the proportion of the component in the opposite biasing direction FR along the axial direction L to the attracting force is increased, and the attracting force is increased. At or near the maximum stroke position Pmax, however, the magnetic resistance at or near the plunger 6 is reduced due to the first protruding portion 11 (protruding portion 8v), and the magnetic flux flowing from the plunger 6 to the core 3 is increased. As a result, the attracting force at or near the maximum stroke position Pmax is also increased.

Moreover, providing the protruding portions 8v, i.e., the first protruding portion 11 and the second protruding portion 12, not only compensates for the decrease in enlarged portion sectional area S which is caused by forming the recessed portion 8c, but also increases the enlarged portion sectional area S as a whole. The magnetic resistance in the increased diameter portion 8 is thus reduced, and a flux linkage is also increased. That is, the flux linkage is increased in the entire region of the stroke, and the attracting force is increased as a whole. Providing the protruding portions 8v and the recessed portion 8c in the increased diameter portion 8 can thus increase the attracting force while maintaining stability with respect to the stroke.

2. Second Embodiment

Figure 8:
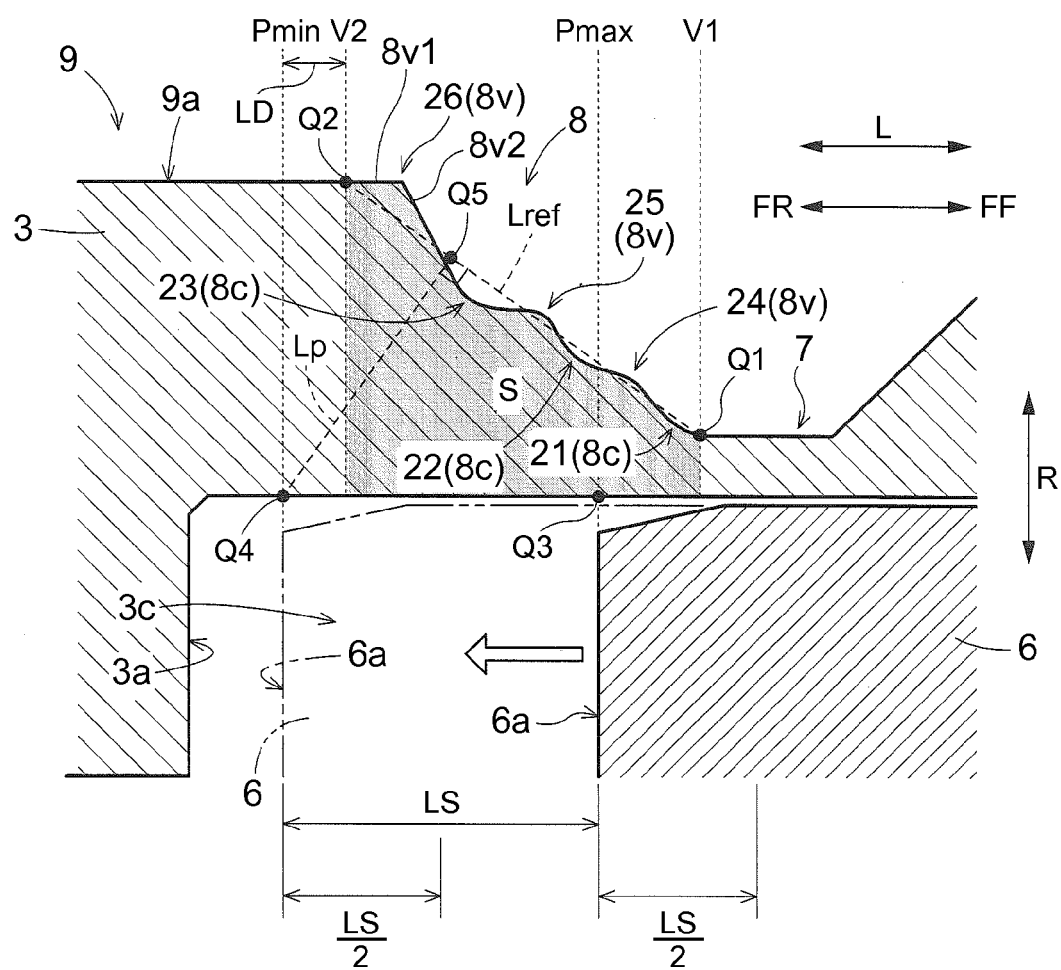
FIG. 8 is a partial enlarged view of a part at or near an increased diameter portion in axial section according to a second embodiment.

A second embodiment of the present invention will be described below based on the accompanying drawings. The present embodiment is different from the first embodiment in the specific configuration of the increased diameter portion 8 provided in the core 3. FIG. 8 is a partial enlarged view of a part at or near the increased diameter portion 8 in the present embodiment. Differences from the first embodiment will be mainly described below. The present embodiment is similar to the first embodiment unless otherwise specified.

The overall configuration of the electromagnetic valve 20 including such a solenoid drive device 10 as shown in FIG. 1 is similar to the first embodiment except for the specific configuration of the increased diameter portion 8. The configuration of the pressure regulating valve portion 40 as the oil pressure control valve is also similar to the first embodiment. Although not specifically described in the first embodiment, as shown in FIG. 1, the pressure regulating valve portion 40 has, in an end region on the opposite biasing direction FR side in the stroke range of the spool 60, a non-control region D1 where an output oil pressure is constant regardless of the position of the spool 60, and has, on the biasing direction FF side of the non-control region D1, a control region D2 where the output oil pressure varies according to the position of the spool 60. As used herein, the expression "oil pressure is constant" does not means that the oil pressure is exactly constant, but includes a slight change in oil pressure which does not result from active control. For example, the expression "oil pressure is constant" includes the case where there is a very small variation in oil pressure etc. due to an oil pressure leaking from a gap between the spool 60 and the sleeve 50.

In the present embodiment, the pressure regulating valve portion 40 has a first non-control region D1 that adjoins the control region D2 in the opposite biasing direction FR, and has a second non-control region D3 that adjoins the control region D2 in the biasing direction FF. The sum of the first non-control region D1, the control region D2, and the second non-control region D3 corresponds to the entire stroke range of the spool 60. In the control region D2, the oil pressure (output oil pressure) that is applied to the outlet port 54 varies according to the position in the axial direction L of the spool 60. In the example shown in FIG. 1, as the spool 60 is displaced in the opposite biasing direction FR, the opening area of the inlet port 52 is reduced, the opening area of the drain port 56 is increased, and the output oil pressure is reduced accordingly. In the first non-control region D1, the inlet port 52 is completely closed by the land 62, and the outlet port 54 and the drain port 56 have a sufficiently large opening area and communicate with each other, so that the output oil pressure is constant at zero. In the second non-control region D3, the drain port 56 is completely closed by the land 64, and the inlet port 52 and the outlet port 54 have a sufficiently large opening area and communicate with each other, so that the output oil pressure is constant at an oil pressure that matches the oil pressure applied to the inlet port 52. That is, in the first non-control region D1 and the second non-control region D2, the output oil pressure is constant regardless of the position of the spool 60.

The configuration of the pressure regulating valve portion 40 shown in FIG. 1 is by way of illustration only. Accordingly, contrary to the example shown in FIG. 1, the pressure regulating valve portion 40 (oil pressure control valve) may be configured so that the opening area of the inlet port 52 is increased and the output oil pressure is increased as the spool 60 is displaced in the opposite biasing direction FR.

As described above, the shape of the core 3 is defined by using the first imaginary boundary plane V1 and the second imaginary boundary plane V2. As shown in FIG. 8, in the present embodiment, the first imaginary boundary plane V1 is set at a position located on the biasing direction FF side of the maximum stroke position Pmax in the axial direction L, and the second imaginary boundary plane V2 is set at a position located on the biasing direction FF side of the minimum stroke position Pmin and on the opposite biasing direction RF side of the maximum stroke position Pmax in the axial direction L. The magnetic flux limiting portion 7 is located in a region on the biasing direction FF side of the first imaginary boundary plane V1, and is formed so as to have a smaller thickness in the radial direction R than a region on the opposite biasing direction FR side of the first imaginary boundary plane V1. The increased diameter portion 8 is formed so that its thickness in the radial direction R is increased in a continuous or stepwise manner from the first imaginary boundary plane V1 toward the opposite biasing direction FR side. In this example, the first imaginary boundary plane V1 is therefore located at the boundary between the magnetic flux limiting portion 7 and the increased diameter portion 8. In other words, the first imaginary boundary plane V1 is set in the boundary portion between the magnetic flux limiting portion 7 and the increased diameter portion 8 of the core 3. The base portion 9 is a portion located on the opposite biasing direction FR side of the bottom surface portion 3a of the core 3 formed in a bottomed cylindrical shape. The core 3 has substantially the same outer diameter in a region other than the magnetic flux limiting portion 7 and the increased diameter portion 8 in the axial direction L. The base portion 9 has a larger thickness than the average thickness of the increased diameter portion 8 and the thickness of the magnetic flux limiting portion 7 in the radial direction R.

The increased diameter portion 8 has recessed portions 8c whose outer surfaces are recessed toward the inner surface in the radial direction R with respect to the increased diameter reference line Lref. In the present embodiment, the increased diameter portion 8 further has protruding portions 8v whose outer surfaces protrude toward the outer surface in the radial direction R beyond the increased diameter reference line Lref. In the form shown by way of example in FIG. 8, the increased diameter portion 8 has a first recessed portion 21, a first protruding portion 24, a second recessed portion 22, a second protruding portion 25, a third recessed portion 23, and a third protruding portion 26 in this order in the opposite biasing direction FR from the first imaginary boundary plane V1 located at the end on the opposite biasing direction FR side of the magnetic flux limiting portion 7. The first recessed portion 21, the second recessed portion 22, and the third recessed portion 23 are the recessed portions 8c, and the first protruding portion 24, the second protruding portion 25, and the third protruding portion 26 are the protruding portions 8v. In the form shown by way of example in FIG. 8, the third recessed portion 23 is formed at a position including an intersection Q5 of a normal Lp from a minimum stroke inner surface point Q4 to the increased diameter reference line Lref and the increased diameter reference line Lref in axial section. Moreover, in the form shown by way of example in FIG. 8, the protruding portion 8v adjoining the second imaginary boundary plane V2 in the biasing direction FF (in this example, the third protruding portion 26) has a first outer surface 8v1 continuous with a radial outer surface (9a) of the core 3 (base portion 9) which is located on the opposite biasing direction FR side of the second imaginary boundary plane V2, and a second outer surface 8v2 connected to the end on the biasing direction FF side of the first outer surface 8v1 and formed in the shape of a truncated conical surface which has a larger tilt angle to the axial direction L than the increased diameter reference line Lref does. That is, as can be seen from FIG. 8, the third protruding portion 26 is formed by two straight lines in axial section. On the other hand, the other protruding portions 8v, namely the first protruding portion 24 and the second protruding portion 25, and the recessed portions 8c, namely the first recessed portion 21, the second recessed portion 22, and the third recessed portion 23, are formed in a curved shape in axial section. Accordingly, a portion from the first protruding portion 24 to the third recessed portion 23 in the opposite biasing direction FF has a curved wave shape in axial section.

The increased diameter reference line Lref is a straight line connecting a first reference point Q1 and a second reference point Q2 in axial section of the core 3 taken along a plane including the central axis of the core 3. The first reference point Q1 is an intersection of the first imaginary boundary plane V1 and the outer surface in the radial direction R of the core 3 in the axial section of the core 3. In the present embodiment, the first imaginary boundary plane V1 is set on the biasing direction FF side of the maximum stroke position Pmax. More specifically, the first imaginary boundary plane V1 is set at a position in the axial direction L between the maximum stroke position Pmax and the position located away from the maximum stroke position Pmax by a distance (LS/2) equal to half the stroke LS of the plunger 6 in the biasing direction FF. In the form shown by way of example in FIG. 8, the first imaginary boundary plane V1 is set at a position located away from the maximum stroke position Pmax by a distance equal to about one third of the stroke LS in the biasing direction FF.

The second reference point Q2 is an intersection of the second imaginary boundary plane V2 and the outer surface in the radial direction R of the core 3 in the axial section of the core 3. In the present embodiment, since the second imaginary boundary plane V2 is set on the biasing direction FF side of the minimum stroke position Pmin. More specifically, the second imaginary boundary plane V2 is set at a position in the axial direction L between the minimum stroke position Pmin and the position located away from the minimum stroke position Pmin by a distance (LS/2) equal to half the stroke LS of the plunger 6 in the biasing direction FF. In the form shown by way of example in FIG. 8, the second imaginary boundary plane V2 is set at a position located away from the minimum stroke position Pmin by a distance equal to about one fifth of the stroke LS in the biasing direction FF.

In the present embodiment, the distance in the axial direction L between the minimum stroke position Pmin and the second imaginary boundary plane V2 is set as follows. As described above, the pressure regulating valve portion 40 as the oil pressure control valve has the first non-control region D1 that adjoins the control region D2 in the opposite biasing direction FR. The second imaginary boundary plane V2 is thus set at a position in the axial direction L which is located away from the minimum stroke position Pmin in the biasing direction FF by a distance LD corresponding to the length in the axial direction L of the first non-control region D1. As described above, the plunger 6 is configured to operate with the spool 60. The pressure regulating valve portion 40 has the non-control regions D1, D2 on the opposite biasing direction FR side and the biasing direction FF side of the control region D2. In these non-control regions D1, D2, the output oil pressure is constant regardless of the position of the spool 60, and the oil pressure is therefore not substantially controlled by displacing the spool 60 by the plunger 6. Accordingly, in the regions corresponding to the non-control regions D1, D2 in the range of the stroke LS of the plunger 6, the attracting force is not strictly required to be constant (stable) with respect to the stroke of the plunger 6. In the stroke regions of the plunger 6 corresponding to the non-control regions D1, D2, the thickness in the radial direction R of the core 3 is therefore not strictly required to change according to the position in the axial direction L like the increased diameter portion 8.

In the present embodiment, the second imaginary boundary plane V2 is thus set at the position in the axial direction L which is located away from the minimum stroke position Pmin in the biasing direction FF by the distance LD corresponding to the length in the axial direction L of the first non-control region D1. Specifically, the distance LD between the minimum stroke position Pmin and the second imaginary boundary plane V2 is the same as the length in the axial direction L of the first non-control region D1. According to this configuration, the plunger 6 can be placed so that the position of the tip end surface 6a of the plunger 6 in the state where the spool 60 is located at the end on the opposite biasing direction FR side of the control region D2 corresponds to (in this example, matches) the second imaginary boundary plane V2 located at the end on the opposite biasing direction FR side of the increased diameter portion 8. Accordingly, the increased diameter portion 8 can be placed as close to the biasing direction FF side as possible within the range that achieves the positional relation in which the control region D2 corresponds to the increased diameter portion 8. A larger thickness in the radial direction R is ensured for the core 3 in the entire region of the stroke LS of the plunger 6 as compared to the first embodiment. In other words, a large sectional area in axial section is ensured for the core 3 in the entire region of the stroke LS of the plunger 6. This can ensure a large amount of magnetic flux flowing in the increased diameter portion 8 and increase the attracting force while ensuring such characteristics that the attracting force of the core 3 attracting the plunger 6 is stable regardless of the stroke position of the spool 60 in the control region D2.

As in the first embodiment, in the present embodiment as well, the protruding portions 8v and the recessed portions 8c are formed so that the enlarged portion sectional area as a sectional area of the core 3 between the first imaginary boundary plane V1 and the second imaginary boundary plane V2 in axial section is larger than the reference sectional area Sref. The reference sectional area Sref is a sectional area of the core 3 between the first imaginary boundary plane V1 and the second imaginary boundary plane V2 in the case where the outer surface of the increased diameter portion 8 is formed by the increased diameter reference line Lref. In this example, the reference sectional area Sref is the area of a quadrilateral surrounded by the first imaginary boundary plane V1, the second imaginary boundary plane V2, the increased diameter reference line Lref, and the inner surface in the radial direction R of the core 3. The enlarged portion sectional area S is the area of a region surrounded by the first imaginary boundary plane V1, the second imaginary boundary plane V2, the outer surface in the radial direction R of the core 3, and the inner surface in the radial direction R of the core 3, as shown shaded in FIG. 8.

Figure 9:
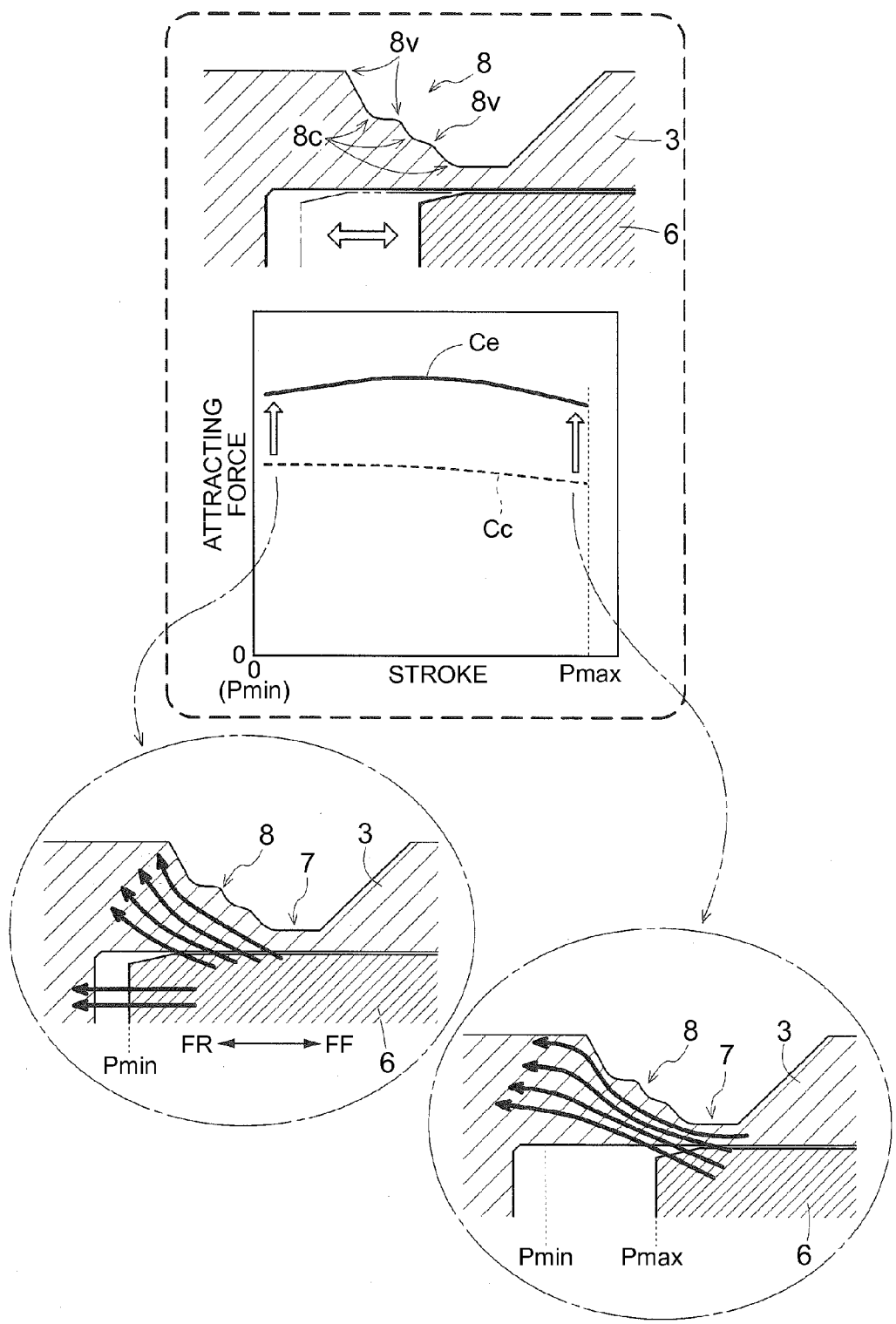
FIG. 9 is an illustration showing the principle of improvement in magnetic performance in the increased diameter portion according to the second embodiment.

The relation between the structure of the increased diameter portion 8 and the magnetic performance (characteristics of attracting force) in the present embodiment will be described with reference to FIG. 9 in comparison with the first embodiment. Like FIGS. 5 to 7, the graph in the middle of FIG. 9 shows the relation between the stroke as the distance between the tip end surface 6a of the plunger 6 and the bottom surface portion 3a of the core 3 and the attracting force that is applied to the plunger 6. Like FIGS. 5 to 7, the characteristic "Cc" shown by broken line in the graph is a characteristic in the case where the increased diameter angle θ is the ideal angle "θc." A characteristic "Ce" shown by solid line in FIG. 9 is a characteristic of the increased diameter portion 8 according to the present embodiment shown in FIG. 8. In the characteristic "Ce," the attracting force is larger in the entire region of the stroke, as compared to the characteristic "Cc" shown in FIG. 7 according to the first embodiment. However, the attracting force is slightly less constant with respect to the stroke as compared to the characteristic "Cc," and the attracting force is slightly lower at both ends of the range of the stroke LS of the plunger 6 than in the central part thereof. As described above, however, since the ends of the range of the stroke LS of the plunger 6 correspond to the non-control regions D1, D2 in the stroke range of the spool 60, such reduction in attracting force in these regions does not cause a significant problem.

As shown in FIG. 9, at or near the minimum stroke position Pmin, the path of the magnetic flux flowing from the plunger 6 to the core 3 is narrowed due to the recessed portions 8c. Specifically, the path of the magnetic flux in the direction perpendicular to the axial direction L is reduced, and is deflected in a direction close to the axial direction L. As a result, the proportion of the component in the opposite biasing direction FR along the axial direction L to the attracting force is increased, and the attracting force is increased. At or near the maximum stroke position Pmax, however, the magnetic resistance at or near the plunger 6 is reduced due to the protruding portions 8v, and the magnetic flux flowing from the plunger 6 to the core 3 is increased. As a result, the attracting force at or near the maximum stroke position Pmax is also increased. Moreover, providing the protruding portions 8v not only compensates for the decrease in enlarged portion sectional area S which is caused by the recessed portions 8c, but also increases the enlarged portion sectional area S as a whole. The magnetic resistance in the increased diameter portion 8 is thus reduced, and a flux linkage is also increased. Moreover, in the present embodiment, both the first imaginary boundary plane V1 and the second imaginary boundary plane V2 are placed on the biasing direction FF side with respect to the first embodiment, whereby the increased diameter reference line Lref is placed on the biasing direction FF side with respect to the first embodiment. This ensures a large sectional area of the core 3 in axial section in the entire region of the stroke LS of the plunger 6. Accordingly, although the attracting force is slightly less constant with respect to the stroke of the plunger 6 as compared to the first embodiment, the flux linkage is increased in the entire region of the stroke LS, and the attracting force is increased as a whole. According to the configuration of the present embodiment, the attracting force can further be increased while ensuring that the attracting force is constant with respect to the stroke of the plunger 6 in the control region D2 of the spool 60.

3. Other Embodiments

Other embodiments of the present invention will be described below. The configuration of each embodiment described below may not only be used by itself, but also be combined with any of the configurations of the other embodiments unless inconsistency arises.

Figure 10:
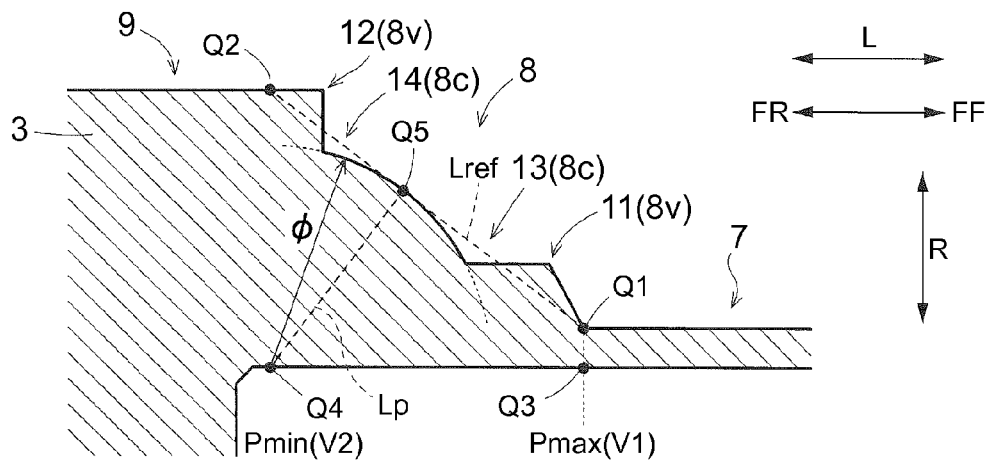
FIG. 10 is a partial enlarged view in axial section showing another configuration example of the increased diameter portion.

(1) The first embodiment is described with respect to the example in which a single recessed portion 8c is formed at the position including the intersection Q5 of the normal Lp from the minimum stroke inner surface point Q4 to the increased diameter reference line Lref and the increased diameter reference line Lref in axial section, as shown in FIG. 2. However, the number of recessed portions 8c is not limited to one, and a plurality of recessed portions 8c may be provided. For example, as shown in FIG. 10, the recessed portion 8c may be formed on both the biasing direction FF side and the opposite biasing direction FR side of the intersection Q5. In the example shown in FIG. 10, the outer surface of the increased diameter portion 8 is formed so that the intersection Q5 is a point of tangency where the increased diameter reference line Lref touches a circle having a radius φ about the minimum stroke inner surface point Q4. A first recessed portion 13 is formed on the biasing direction FF side of this point of tangency, and a second recessed portion 14 is formed on the opposite biasing direction FR side of this point of tangency.

Figure 11:
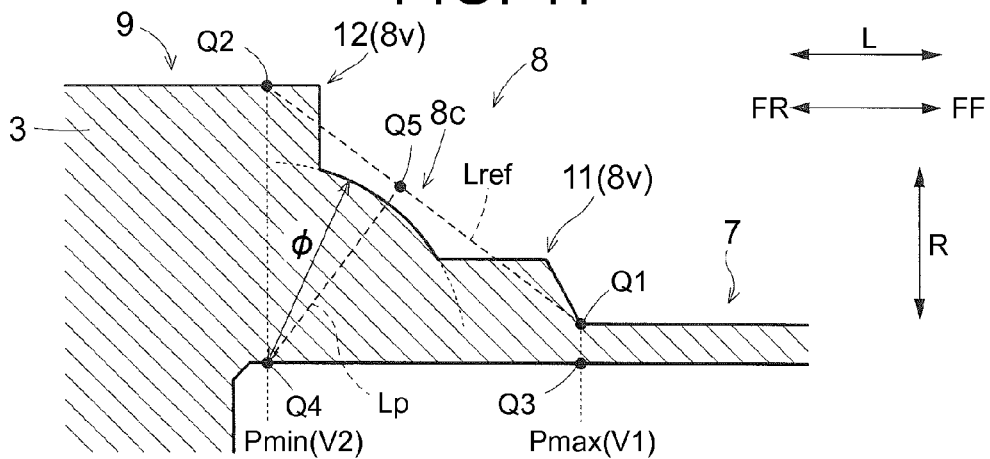
FIG. 11 is a partial enlarged view in axial section showing still another configuration example of the increased diameter portion.
Figure 12:
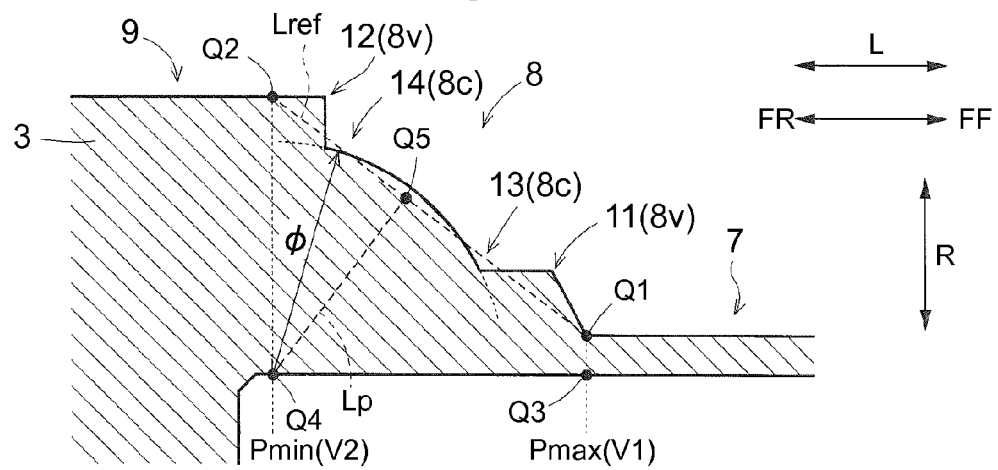
FIG. 12 is a partial enlarged view in axial section showing yet another configuration example of the increased diameter portion.

As described above with reference to FIG. 7, the recessed portion 8c is provided in order to adjust the direction of the magnetic flux at or near the minimum stroke position Pmin. If the surface where the recessed portion 8c is formed (the outer shape of the increased diameter portion 8 in axial section) is located at the same distance from the minimum stroke inner surface point Q4 (radius φ), the effective recessed portion 8c can be provided while maintaining the maximum enlarged portion sectional area S. In this regard, other configurations are also preferred in which the surface where the recessed portion 8c is formed has an arc shape. For example, in the case where a single recessed portion 8c is provided at a position including the intersection Q5 as in the form shown in FIG. 2, the surface where the recessed portion 8c is formed may be formed as an arc about the minimum stroke inner surface point Q4, as shown in FIG. 11. In the case where the recessed portion 8c is provided on both the biasing direction FF side and the opposite biasing direction FR side of the intersection Q5 as in the form shown in FIG. 10, and the surface where the recessed portion 8c is formed as an arc about the minimum stroke inner surface point Q4, the intersection Q5 need not necessarily be the point of tangency where the increased diameter reference line Lref touches a circle about the minimum stroke inner surface point Q4. For example, as shown in FIG. 12, the arc may protrude outward in the radial direction R beyond the increased diameter reference line Lref along the normal Lp.

Figure 13:
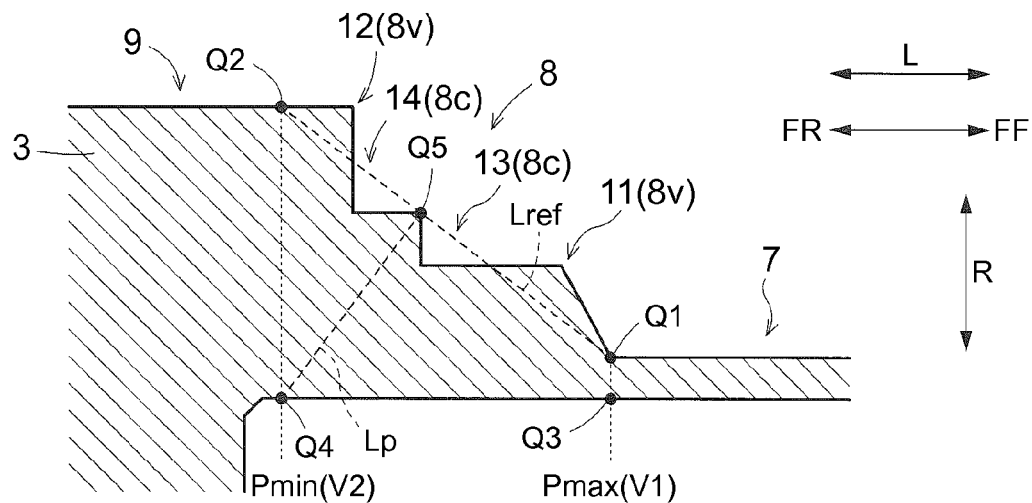
FIG. 13 is a partial enlarged view in axial section showing a further configuration example of the increased diameter portion.
Figure 14:
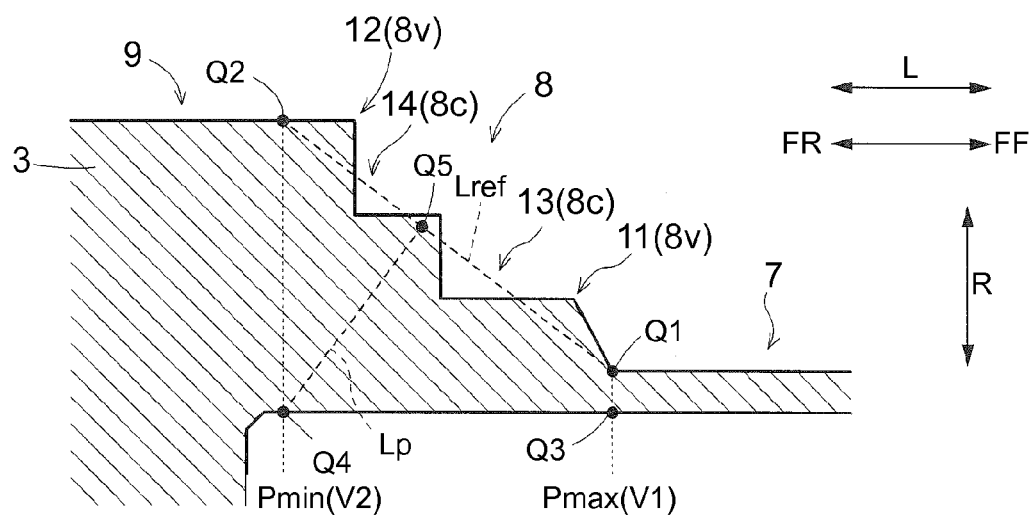
FIG. 14 is a partial enlarged view in axial section showing a still further configuration example of the increased diameter portion.

(2) The first embodiment is described with respect to the form in which a single recessed portion 8c is formed at the position including the intersection Q5 of the normal Lp and the increased diameter reference line Lref and the surface where the recessed portion 8c is formed is formed by an arc or a straight line as shown in FIGS. 2 and 11. However, the surface where the recessed portion 8c is formed may be formed by combination of a plurality of straight and curved lines in axial section, such as a staircase shape. In the case where the surface where the recessed portion 8c is formed has a staircase shape, an inflection point or a vertex may be set at the intersection Q5 of the normal Lp and the increased diameter reference line Lref. FIG. 13 shows an example in which the surface where the recessed portion 8c is formed has a staircase shape, and a vertex is set at the intersection Q5. In this case, a first recessed portion 13 is formed on the biasing direction FF side of the intersection Q5, and a second recessed portion 14 is formed on the opposite biasing direction FR side of the intersection Q5. In this case as well, a vertex of the staircase shape may protrude outward in the radial direction R beyond the increased diameter reference line Lref, as in the form shown in FIG. 12 (see FIG. 14).

(3) The above description with reference to FIGS. 2 and 10 to 14 shows the form in which the protruding portion 8v adjoining the second imaginary boundary plane V2 in the biasing direction FF (in this case, the second protruding portion 12) has the first outer surface 8v1 continuous with the radial outer surface (9a) of the core 3 (base portion 9) which is located on the opposite biasing direction FR side of the second imaginary boundary plane V2, and the second outer surface 8v2 connected to the end on the biasing direction FF side of the first outer surface 8v1 and extending along the direction perpendicular to the axial direction L. However, the second protruding portion 12 is not limited to this form as long as a required enlarged portion sectional area S can be secured. For example, the second protruding portion 12 may not have the first outer surface 8v1 and the second outer surface 8v2 and may be formed by a tilted surface or curved surface that is continuous from the end on the opposite biasing direction FR side of the recessed portion 8c to the second imaginary boundary plane V2. Each of the first outer surface 8v1 and the second outer surface 8v2 may be formed by a tilted surface or curved surface. The second protruding portion 12 may have three or more tilted surfaces or curved surfaces.

(4) FIGS. 2 and 10 to 14 show the form in which the increased diameter portion 8 has two protruding portions 8v. However, the increased diameter portion 8 may have a single protruding portion 8v. In order to increase the enlarged portion sectional area S, it is preferable to provide the protruding portion 8v at a plurality of positions so as to compensate for the decrease in enlarged portion sectional area S which is caused by forming the recessed portion 8c for deflecting the magnetic flux and to increase the enlarged portion sectional area S. The form in which the protruding portion 8v is provided on both sides of the recessed portion 8c is therefore shown in FIGS. 2 and 10 to 14. However, the protruding portion 8v may be provided only on one side of the recessed portion 8c as long as the decrease in area caused by the recessed portion 8c can be compensated for and a required enlarged portion sectional area S can be secured. Preferably, the protruding portion 8v is provided on the biasing direction FF side (the magnetic flux limiting portion 7 side) of the recessed portion 8c in order to increase a flux linkage at or near the maximum stroke position Pmax.

Figure 15:
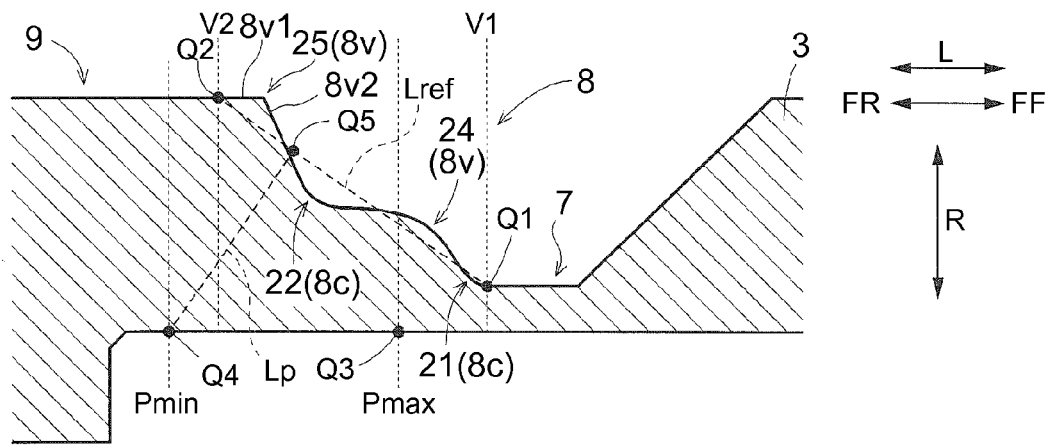
FIG. 15 is a partial enlarged view in axial section showing a yet further configuration example of the increased diameter portion.

(5) The second embodiment is described with respect to the example in which the increased diameter portion 8 has the first recessed portion 21, the first protruding portion 24, the second recessed portion 22, the second protruding portion 25, the third recessed portion 23, and the third protruding portion 26 in this order in the opposite biasing direction FR from the first imaginary boundary plane V1, as shown in FIG. 8. However, embodiments of the present invention are not limited to this. For example, as shown in FIG. 15, it is also preferable that the increased diameter portion 8 have the first recessed portion 21, the first protruding portion 24, the second recessed portion 22, and the second protruding portion 25 in this order in the opposite biasing direction FR from the first imaginary boundary plane V1. In the form shown by way of example in FIG. 15, the second recessed portion 22 is formed at a position including the intersection Q5 of the normal Lp from the minimum stroke inner surface point Q4 to the increased diameter reference line Lref and the increased diameter reference line Lref in axial section. In the form shown in FIG. 15 as well, the protruding portion 8v adjoining the second imaginary boundary plane V2 in the biasing direction FF (in this case, the second protruding portion 25) has the first outer surface 8v1 continuous with the radial outer surface (9a) of the core 3 (base portion 9) which is located on the opposite biasing direction FR side of the second imaginary boundary plane V2, and the second outer surface 8v2 connected to the end on the biasing direction FF side of the first outer surface 8v1 and formed in the shape of a truncated conical surface which has a larger tilt angle to the axial direction L than the increased diameter reference line Lref does. On the other hand, the other protruding portion 8v, namely the first protruding portion 24, and the recessed portions 8c, namely the first recessed portion 21 and the second recessed portion 22, are formed in a curved shape in axial section. Accordingly, a portion from the first protruding portion 24 to the second recessed portion 22 in the opposite biasing direction FR has a curved wave shape in axial section.

Figure 16:
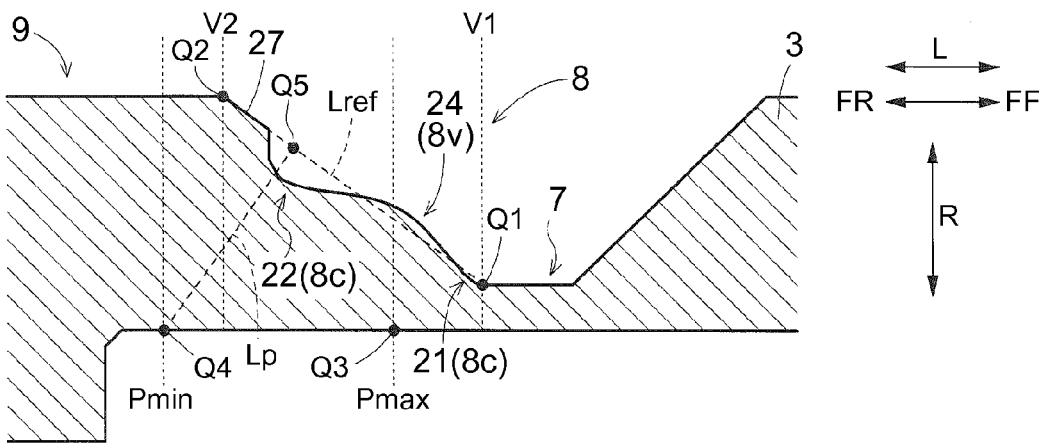
FIG. 16 is a partial enlarged view in axial section showing a yet further configuration example of the increased diameter portion.

(6) FIGS. 2, 8, and 10 to 15 are described with respect to the example in which the protruding portion 8v is formed in a region adjoining the second imaginary boundary plane V2 in the biasing direction FF. However, embodiments of the present invention are not limited to this. For example, as shown in FIG. 16, it is also preferable that no protruding portion 8v be formed in the region adjoining the second imaginary boundary plane V2 in the biasing direction FF. In the form shown by way of example in FIG. 16, the increased diameter portion 8 has in the region adjoining the second imaginary boundary plane V2 in the biasing direction FF a truncated conical surface 27 whose shape in axial section is a straight line matching the increased diameter reference line Lref. In the form shown in FIG. 16, the increased diameter portion 8 has the first recessed portion 21, the first protruding portion 24, the second recessed portion 22, and the truncated conical surface 27 in this order in the opposite biasing direction FR from the first imaginary boundary plane V1. The first and second embodiments are described with respect to the case where the enlarged portion sectional area S is larger than the reference sectional area Sref, as shown in FIGS. 3 and 8. As shown in FIG. 16, the protruding portion 8v and the recessed portions 8c may be formed so that the enlarged portion sectional area S is smaller than the reference sectional area Sref.

Figure 17:
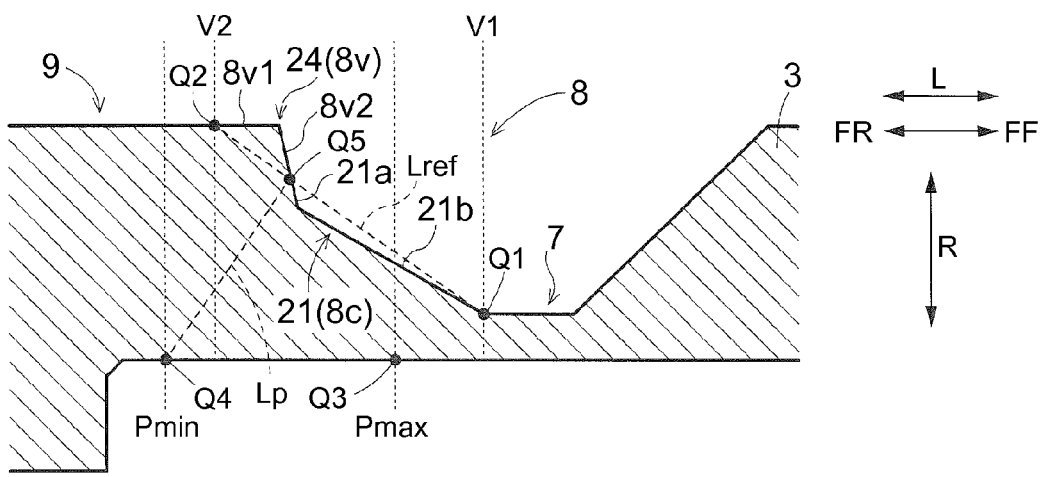
FIG. 17 is a partial enlarged view in axial section showing a yet further configuration example of the increased diameter portion.

(7) The second embodiment is described with respect to the example in which the protruding portions 8v other than the third protruding portion 26 and the recessed portions 8c in the increased diameter portion 8 have a curved shape in axial section, as shown in FIG. 8. However, embodiments of the present invention are not limited to this. For example, as shown in FIG. 17, it is also preferable that all of the recessed portions 8c and the protruding portions 8v basically have a straight line shape in axial section. With such a configuration, the entire outer surface of the increased diameter portion 8 is basically formed by a truncated conical surface or a cylindrical surface. The recessed portions 8c and the protruding portions 8v of the increased diameter portion 8 can therefore be easily formed by a commonly used processing apparatus such as a lathe, facilitating reduction in manufacturing cost. In the form shown by way of example in FIG. 17, the increased diameter portion 8 has the first recessed portion 21 and the first protruding portion 24 in this order in the opposite biasing direction FR from the first imaginary boundary plane V1. The first protruding portion 24 adjoining the second imaginary boundary plane V2 in the biasing direction FF has the first outer surface 8v1 continuous with the radial outer surface (9a) of the core 3 (base portion 9) which is located on the opposite biasing direction FR side of the second imaginary boundary plane V2, and the second outer surface 8v2 connected to the end on the biasing direction FF side of the first outer surface 8v1 and formed in the shape of a truncated conical surface which has a larger tilt angle to the axial direction L than the increased diameter reference line Lref does. The first recessed portion 21 adjoining the first protruding portion 24 in the biasing direction FF has a first outer surface 21a continuous with the second outer surface 8v2 and a second outer surface 21b connected to the end on the biasing direction FF side of the first outer surface 21a and formed in the shape of a truncated conical surface which has a smaller tilt angle to the axial direction L than the increased diameter reference line Lref does. In this example, the second outer surface 8v2 of the first protruding portion 24 and the first outer surface 21a of the first recessed portion 21 form the same truncated conical surface. The end on the biasing direction FF side of the second outer surface 21b of the first recessed portion 21 matches the first imaginary boundary plane V1, and is connected to the end on the opposite biasing direction FR side of the magnetic flux limiting portion 7. According to this configuration, a single recessed portion 8c and a single protruding portion 8v can be provided by merely forming two truncated conical surfaces (two straight lines in axial section).

INDUSTRIAL APPLICABILITY

The present invention is applicable, for example, to solenoid drive devices including a cylindrical coil, a core placed radially inward of the cylindrical coil and having a bottomed cylindrical inner surface, and a plunger placed radially inward of the core such that the plunger can be displaced along the axial direction of the core according to the amount of current that is applied to the cylindrical coil.

DESCRIPTION OF THE REFERENCE NUMERALS

2: Cylindrical Coil
3: Core
3a: Bottom Surface Portion
6: Plunger
6a: Tip End Surface
7: Magnetic Flux Limiting Portion
8: Increased Diameter Portion
8c: Recessed Portion
8v: Protruding Portion
8v1: First Outer Surface
8v2: Second Outer Surface
10: Solenoid Drive Device
11: First Protruding Portion
12: Second Protruding Portion
40: Pressure Regulating Valve Portion (Oil Pressure Control Valve)
60: Spool
D1, D3: Non-Control Region
D2: Control Region
FF: Biasing Direction
FR: Opposite Biasing Direction
L: Axial Direction
Lp: Normal
Lref: Increased Diameter Reference Line
LS: Stroke of Plunger
Pmax: Maximum Stroke Position
Pmin: Minimum Stroke Position
Q1: First Reference Point (Maximum Stroke Outer Surface Point)
Q2: Second Reference Point (Minimum Stroke Outer Surface Point)
Q4: Minimum Stroke Inner Surface Point
R: Radial Direction
S: Enlarged Portion Sectional Area
Sref: Reference Sectional Area
V1: First Imaginary Boundary Plane
V2: Second Imaginary Boundary Plane

The invention claimed is:
1. A solenoid drive device including
a cylindrical coil,
a core placed radially inward of the cylindrical coil and having a bottomed cylindrical inner surface, and
a plunger that can be displaced along an axial direction of the core and is subjected to biasing force in a direction in which the plunger is separated from a bottom surface portion of the core along the axial direction, and that is placed radially inward of the core,
the solenoid drive device being configured so that, according to an amount of current that is applied to the cylindrical coil, the plunger can be displaced between a maximum stroke position as a position where a tip end surface of the plunger which faces the bottom surface portion is located farthest from the bottom surface portion due to the biasing force when no current is applied to the cylindrical coil and a minimum stroke position as a position where the tip end surface of the plunger is located closest to the bottom surface portion by current application to the cylindrical coil, wherein
a biasing direction is a direction in which the plunger is biased by the biasing force along the axial direction, and an opposite biasing direction is a direction opposite to the biasing direction,
a first imaginary boundary plane as an imaginary plane perpendicular to the axial direction is set in a boundary portion between a magnetic flux limiting portion and an increased diameter portion of the core so as to be located at the maximum stroke position in the axial direction or a position located on a side in the biasing direction of the maximum stroke position, and a second imaginary boundary plane as an imaginary plane perpendicular to the axial direction is set at the minimum stroke position in the axial direction or a position located on the side in the biasing direction of the minimum stroke position and on a side in the opposite biasing direction of the maximum stroke position,
the magnetic flux limiting portion is located in a region on the side in the biasing direction of the first imaginary boundary plane, and is formed so as to have a smaller radial thickness than a region on the side in the opposite biasing direction of the first imaginary boundary plane,
the increased diameter portion is formed so that its radial thickness is increased in a continuous or stepwise manner from the first imaginary boundary plane toward the side in the opposite biasing direction,
an increased diameter reference line is a straight line connecting a first reference point and a second reference point, the first reference point being an intersection of the first imaginary boundary plane and a radial outer surface of the core in an axial section of the core taken along a plane including a central axis of the core, and the second reference point being an intersection of the second imaginary boundary plane and the radial outer surface of the core in the axial section, and
the increased diameter portion has a recessed portion whose outer surface is recessed toward a radial inner surface with respect to the increased diameter reference line.
2. The solenoid drive device according to claim 1, wherein the recessed portion is formed at a position including an intersection of a normal from a minimum stroke inner surface point to the increased diameter reference line and the increased diameter reference line in the axial section, or is formed on both the side in biasing direction and the side in the opposite biasing direction of the intersection in the axial section, the minimum stroke inner surface point being a point on the radial inner surface of the core which corresponds to the minimum stroke position.

3. The solenoid drive device according to claim 2, wherein the increased diameter portion further has a protruding portion whose outer surface protrudes toward the radial outer surface beyond the increased diameter reference line.

4. The solenoid drive device according to claim 3, wherein the protruding portion and the recessed portion are formed so that an enlarged portion sectional area as a sectional area of the core between the first imaginary boundary plane and the second imaginary boundary plane in the axial section is larger than a reference sectional area in all of the axial sections along entire circumference, the reference sectional area being a sectional area of the core in a case where an outer surface of the increased diameter portion is formed by the increased diameter reference line.

5. The solenoid drive device according to claim 4, wherein the increased diameter portion has a first protruding portion as the protruding portion, the recessed portion, and a second protruding portion as the protruding portion in this order in the opposite biasing direction from the first imaginary boundary plane.

6. The solenoid drive device according to claim 3, wherein the increased diameter portion has a first protruding portion as the protruding portion, the recessed portion, and a second protruding portion as the protruding portion in this order in the opposite biasing direction from the first imaginary boundary plane.

7. The solenoid drive device according to claim 3, wherein the protruding portion adjoining the second imaginary boundary plane in the biasing direction has a first outer surface continuous with the radial outer surface of the core which is located on side of the opposite biasing direction of the second imaginary boundary plane, and a second outer surface connected to an end on the side in the biasing direction of the first outer surface and formed in a shape of a truncated conical surface which has a larger tilt angle to the axial direction than the increased diameter reference line does.

8. The solenoid drive device according to claim 1, wherein the increased diameter portion further has a protruding portion whose outer surface protrudes toward the radial outer surface beyond the increased diameter reference line.

9. The solenoid drive device according to claim 8, wherein the protruding portion and the recessed portion are formed so that an enlarged portion sectional area as a sectional area of the core between the first imaginary boundary plane and the second imaginary boundary plane in the axial section is larger than a reference sectional area in all of the axial sections along entire circumference, the reference sectional area being a sectional area of the core in a case where an outer surface of the increased diameter portion is formed by the increased diameter reference line.

10. The solenoid drive device according to claim 9, wherein the increased diameter portion has a first protruding portion as the protruding portion, the recessed portion, and a second protruding portion as the protruding portion in this order in the opposite biasing direction from the first imaginary boundary plane.

11. The solenoid drive device according to claim 8, wherein the increased diameter portion has a first protruding portion as the protruding portion, the recessed portion, and a second protruding portion as the protruding portion in this order in the opposite biasing direction from the first imaginary boundary plane.

12. The solenoid drive device according to claim 11, wherein the increased diameter portion has a first protruding portion as the protruding portion, the recessed portion, and a second protruding portion as the protruding portion in this order in the opposite biasing direction from the first imaginary boundary plane.

13. The solenoid drive device according to claim 8, wherein the protruding portion adjoining the second imaginary boundary plane in the biasing direction has a first outer surface continuous with the radial outer surface of the core which is located on side of the opposite biasing direction of the second imaginary boundary plane, and a second outer surface connected to an end on the side in the biasing direction of the first outer surface and formed in a shape of a truncated conical surface which has a larger tilt angle to the axial direction than the increased diameter reference line does.

14. The solenoid drive device according to claim 1, wherein the first imaginary boundary plane is set at a position in the axial direction between the maximum stroke position and a position located away from the maximum stroke position by a distance equal to half a stroke of the plunger in the biasing direction, and the second imaginary boundary plane is set at a position in the axial direction between the minimum stroke position and a position located away from the minimum stroke position by a distance equal to half the stroke of the plunger in the biasing direction.

15. The solenoid drive device according to claim 1, wherein
the plunger is configured to operate with a spool of an oil pressure control valve,
the oil pressure control valve has, in an end region on the side in the opposite biasing direction in a stroke range of the spool, a non-control region where an output oil pressure is constant regardless of a position of the spool, and has, on the side in the biasing direction of the non-control region, a control region where the output oil pressure varies according to the position of the spool, and
the second imaginary boundary plane is set at a position in the axial direction which is located away from the minimum stroke position in the biasing direction by a distance corresponding to a length in the axial direction of the non-control region.

16. The solenoid drive device according to claim 1, wherein
the first imaginary boundary plane is set at the maximum stroke position in the axial direction, and the second imaginary boundary plane is set at the minimum stroke position in the axial direction.

17. A solenoid drive device including
a cylindrical coil,
a core placed radially inward of the cylindrical coil and having a bottomed cylindrical inner surface, and
a plunger that can be displaced along an axial direction of the core and is subjected to biasing force in a direction in which the plunger is separated from a bottom surface portion of the core along the axial direction, and that is placed radially inward of the core, the solenoid drive device being configured so that, according to an amount of current that is applied to the cylindrical coil, the plunger can be displaced between a maximum stroke position as a position where a tip end surface of the plunger which faces the bottom surface portion is located farthest from the bottom surface portion due to the biasing force when no current is applied to the cylindrical coil and a minimum stroke position as a position where the tip end surface of the plunger is located closest to the bottom surface portion by current application to the cylindrical coil, wherein a biasing direction is a direction in which the plunger is biased by the biasing force along the axial direction, and an opposite biasing direction is a direction opposite to the biasing direction, the core includes a magnetic flux limiting portion that is located in a region on a side in the biasing direction of the maximum stroke position and that is formed so as to have a smaller radial thickness than a region on a side in the opposite biasing direction of the maximum stroke position, and an increased diameter portion that is formed so that its radial thickness is increased from an end on the side in the opposite biasing direction of the magnetic flux limiting portion toward the side in opposite biasing direction, an increased diameter reference line is a straight line connecting, in an axial section of the core taken along a plane including a central axis of the core, a maximum stroke outer surface point as a point on a radial outer surface of the core which corresponds to the maximum stroke position and a minimum stroke outer surface point as a point on the radial outer surface of the core which corresponds to the minimum stroke position, the increased diameter portion has a protruding portion whose outer surface protrudes toward the radial outer surface beyond the increased diameter reference line, and a recessed portion whose outer surface is recessed toward a radial inner surface with respect to the increased diameter reference line, and the protruding portion and the recessed portion are formed so that an enlarged portion sectional area as a sectional area of the core between the maximum stroke position and the minimum stroke position in the axial section is larger than a reference sectional area in all of the axial sections along entire circumference, the reference sectional area being a sectional area of the core in a case where an outer surface of the increased diameter portion is formed by the increased diameter reference line.

18. The solenoid drive device according to claim 17, wherein the increased diameter portion has a first protruding portion as the protruding portion, the recessed portion, and a second protruding portion as the protruding portion in this order in the opposite biasing direction from the end on the side in the opposite biasing direction of the magnetic flux limiting portion.

19. The solenoid drive device according to claim 17, wherein the recessed portion is formed at a position including an intersection of a normal from a minimum stroke inner surface point to the increased diameter reference line and the increased diameter reference line in the axial section, or is formed on both the side in the biasing direction and the side in the opposite biasing direction of the intersection in the axial section, the minimum stroke inner surface point being a point on the radial inner surface of the core which corresponds to the minimum stroke position.

20. The solenoid drive device according to claim 17, wherein the protruding portion adjoining the recessed portion in the opposite biasing direction has a first outer surface continuous with the radial outer surface of the core which is located on the side in the opposite biasing direction of the minimum stroke position, and a second outer surface extending from an end on the side in the opposite biasing direction of the recessed portion to the first outer surface along a direction perpendicular to the axial direction.

* * * * *